United States Patent
Baba

(10) Patent No.: US 9,661,042 B2
(45) Date of Patent: *May 23, 2017

(54) DATA SHARE SYSTEM, DATA PROCESS APPARATUS, AND COMPUTER-READABLE RECORDING MEDIUM

(71) Applicant: RICOH COMPANY, LTD., Tokyo (JP)

(72) Inventor: Ryoichi Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 14/601,396

(22) Filed: Jan. 21, 2015

(65) Prior Publication Data

US 2015/0134744 A1  May 14, 2015

Related U.S. Application Data

(63) Continuation of application No. 13/550,907, filed on Jul. 17, 2012, now Pat. No. 8,972,500.

(30) Foreign Application Priority Data

Jul. 26, 2011 (JP) .................. 2011-163381
Dec. 21, 2011 (JP) .................. 2011-279510

(51) Int. Cl.
*H04L 29/06* (2006.01)
*G06F 9/50* (2006.01)
*H04W 4/00* (2009.01)

(52) U.S. Cl.
CPC ............ *H04L 65/403* (2013.01); *G06F 9/505* (2013.01); *G06F 9/5033* (2013.01); *H04W 4/008* (2013.01)

(58) Field of Classification Search
CPC .... H04L 67/104; H04L 12/18–12/1813; G06F 17/30
(Continued)

(56) References Cited

U.S. PATENT DOCUMENTS 7,167,898 B2  1/2007  Sato et al.
7,979,490 B2  7/2011  Guislain et al.
(Continued)

FOREIGN PATENT DOCUMENTS

JP  2004-304698  10/2004
JP  2005-208913  8/2005
(Continued)

OTHER PUBLICATIONS

Japanese Office Action dated Jul. 7, 2015.
(Continued)

*Primary Examiner* — Kevin Bates
*Assistant Examiner* — Chen-Liang Huang
(74) *Attorney, Agent, or Firm* — IPUSA, PLLC

(57) ABSTRACT

A data process apparatus for sharing shared data among plural data process apparatuses participating in an event. The data process apparatus includes a participation notification reception unit configured to receive a participation notification from each of the plural data process apparatus including first and second data process apparatuses in the event, a notifying unit configured to notify the second data process apparatus to the first data process apparatus as a data obtain target from which the shared data is to be obtained. The second data process apparatus is a data process apparatus from which the participation notification has already been received by the participation notification reception unit.

7 Claims, 28 Drawing Sheets

(58) Field of Classification Search
USPC .......................................... 709/204; 715/751
See application file for complete search history.

(56) References Cited

U.S. PATENT DOCUMENTS

| | | | |
|---|---|---|---|
| 2003/0009587 A1 | 1/2003 | Harrow et al. | |
| 2003/0055893 A1* | 3/2003 | Sato | G06Q 10/107 709/204 |
| 2004/0153841 A1* | 8/2004 | Beck | G06F 11/0793 714/42 |
| 2009/0248793 A1 | 10/2009 | Jacobsson et al. | |
| 2009/0254659 A1* | 10/2009 | Li | H04N 7/17318 709/225 |
| 2014/0033067 A1 | 1/2014 | Pittenger et al. | |

FOREIGN PATENT DOCUMENTS

| | | |
|---|---|---|
| JP | 2006-268626 | 10/2006 |
| JP | 2006-285387 | 10/2006 |

OTHER PUBLICATIONS

Chinese Office Action dated May 19, 2015.
Japanese Office Action dated Oct. 4, 2016.
Extended European Search Report dated Nov. 26, 2012.

* cited by examiner

| MANAGEMENT IDENTIFIER (ID) | DEVICE IDENTIFIER (IP ADDRESS) |
|---|---|
| 1 | 192.168.11.001 |
| 2 | 192.168.11.002 |
| 3 | 192.168.11.003 |
| 4 | 192.168.11.004 |
| .... | .... |

| MANAGEMENT IDENTIFIER (ID) [TRANSMISSION ORIGIN] | MANAGEMENT IDENTIFIER (ID) [TRANSMISSION DESTINATION] |
|---|---|
| 1 | 2 |
| 1 | 3 |
| 1 | 4 |
| .... | .... |

| MANAGEMENT IDENTIFIER (ID) |
|---|
| 2 |
| 3 |
| 4 |
| .... |

| MANAGEMENT IDENTIFIER (ID) | DEVICE IDENTIFIER (IP ADDRESS) |
|---|---|
| 1 | 192.168.11.010 |

↓

20D

| MANAGEMENT IDENTIFIER (ID) | DEVICE IDENTIFIER (IP ADDRESS) |
|---|---|
| 1 | 192.168.11.010 |
| 2 | 192.168.11.011 |

| MANAGEMENT IDENTIFIER (ID) [TRANSMISSION ORIGIN] | MANAGEMENT IDENTIFIER (ID) [TRANSMISSION DESTINATION] |
|---|---|
| — | — |

↓

30D

| MANAGEMENT IDENTIFIER (ID) [TRANSMISSION ORIGIN] | MANAGEMENT IDENTIFIER (ID) [TRANSMISSION DESTINATION] |
|---|---|
| 1 | 2 |

| MANAGEMENT IDENTIFIER (ID) |
|---|
| 1 |
| 2 |

↑

40D

| MANAGEMENT IDENTIFIER (ID) |
|---|
| 1 |

| MANAGEMENT IDENTIFIER (ID) [TRANSMISSION ORIGIN] | MANAGEMENT IDENTIFIER (ID) [TRANSMISSION DESTINATION] |
|---|---|
| – | – |

↑

30D

| MANAGEMENT IDENTIFIER (ID) [TRANSMISSION ORIGIN] | MANAGEMENT IDENTIFIER (ID) [TRANSMISSION DESTINATION] |
|---|---|
| 1 | 2 |

| MANAGEMENT IDENTIFIER (ID) |
|---|
| 1 |
| 2 |

↓

40D

| MANAGEMENT IDENTIFIER (ID) |
|---|
| 1 |
| 2 |
| 3 |

| MANAGEMENT IDENTIFIER (ID) [TRANSMISSION ORIGIN] | MANAGEMENT IDENTIFIER (ID) [TRANSMISSION DESTINATION] |
|---|---|
| 2 | 3 |

↓

30D

| MANAGEMENT IDENTIFIER (ID) [TRANSMISSION ORIGIN] | MANAGEMENT IDENTIFIER (ID) [TRANSMISSION DESTINATION] |
|---|---|
| – | – |

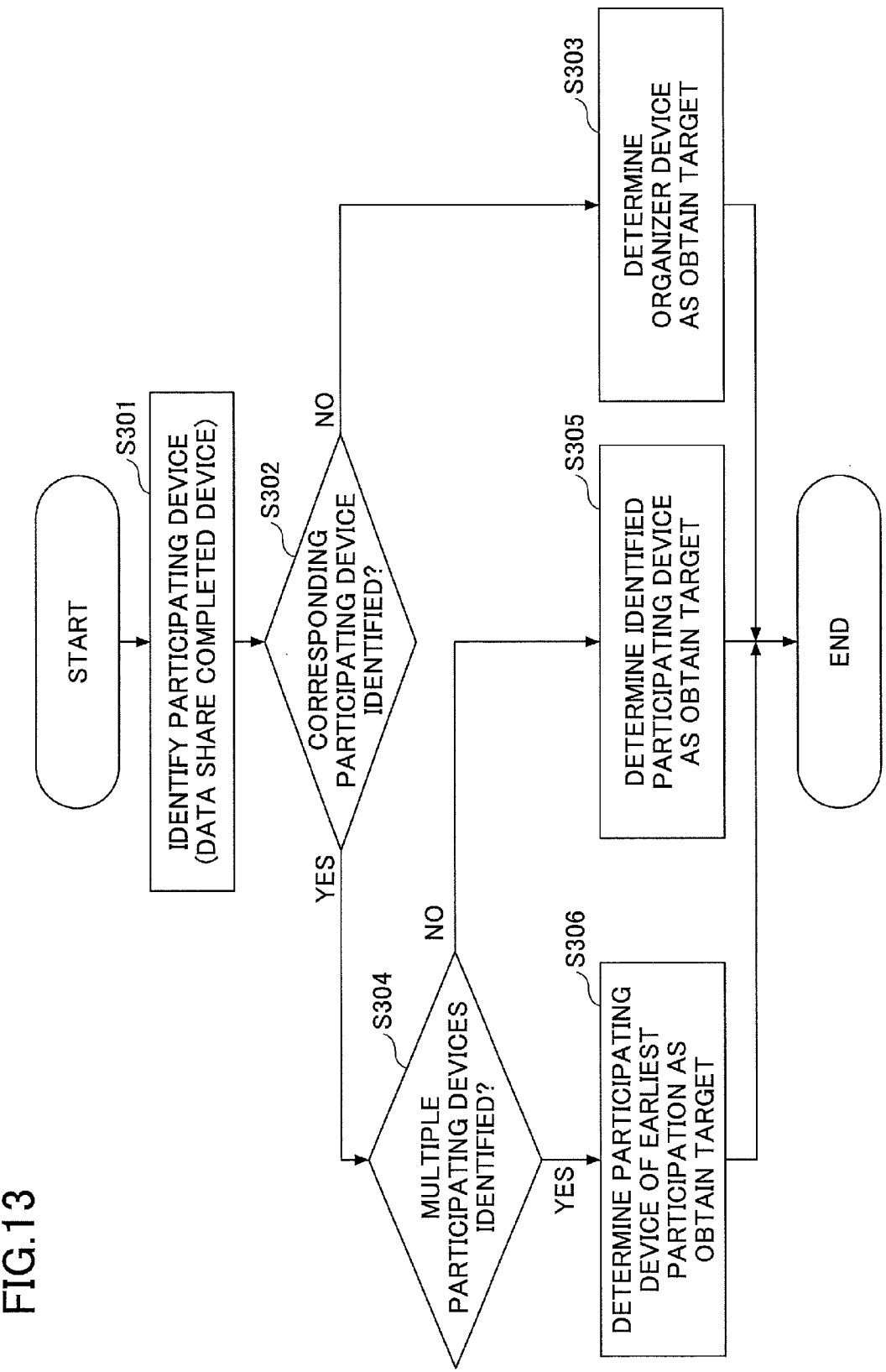

DATA SHARE SYSTEM, DATA PROCESS APPARATUS, AND COMPUTER-READABLE RECORDING MEDIUM

CROSS-REFERENCE TO RELATED APPLICATIONS

This application is a Continuation Application of the U.S. patent application Ser. No. 13/550,907 filed on Jul. 17, 2012, and is based upon and claims the benefit of priority of the prior Japanese Patent Application Nos. 2011-163381 and 2011-279510 filed on Jul. 26, 2011, and Dec. 21, 2011, respectively, the entire contents of which are incorporated herein by reference.

BACKGROUND OF THE INVENTION

1. Field of the Invention

The present invention relates to a data share system, a data process apparatus, and a computer-readable recording medium. For example, a data share system, a data process apparatus, and a computer-readable recording medium for sharing data between data process apparatuses having a communication function.

2. Description of the Related Art

For example, Japanese Laid-Open Patent Publication No. 2006-268626 discloses a technology applied to a case of organizing a conference using shared documents in which an organizer of the conference transmits documents to be shared by transmitting document data to terminals (clients) of the participants of the conference from a server prior to the conference.

Thus, the sharing of data by transmitting/receiving data between a server and a client is known.

However, with the conventional method, data is shared between data process apparatus by providing shared data from a single data process apparatus to other data process apparatuses. This results to problems of a large work load and a long data transmission time.

For example, in a case where of a conference having many participants, multiple data process apparatuses need to obtain data of documents used in the conference by accessing a data process apparatus providing shared data before the conference. Therefore, access for obtaining shared data is concentrated to the data process apparatus that provides the shared data. This results in large communication process load and a long time for transmitting the shared data. Thus, in a case of sharing data between multiple data process apparatuses, it is desired to reduce process load by dispersing the process load and to share data efficiently.

SUMMARY OF THE INVENTION

The present invention may provide a data share system, a data process apparatus, and a computer-readable recording medium that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data share system, a data process apparatus, and a computer-readable recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data process apparatus for sharing shared data among plural data process apparatuses participating in an event, the data process apparatus including: a participation notification reception unit configured to receive a participation notification from each of the plural data process apparatus including first and second data process apparatuses in the event; and a notifying unit configured to notify the second data process apparatus to the first data process apparatus as a data obtain target from which the shared data is to be obtained; wherein the second data process apparatus is a data process apparatus from which the participation notification has already been received by the participation notification reception unit.

Other objects, features and advantages of the present invention will become more apparent from the following detailed description when read in conjunction with the accompanying drawings.

BRIEF DESCRIPTION OF THE DRAWINGS

FIG. 4 is a schematic diagram illustrating an example of a data configuration of a participant list according to an embodiment of the present invention;

FIG. 5 is a schematic diagram illustrating an example of a data configuration of an ongoing transmission list according to an embodiment of the present invention;

FIG. 6 is a schematic diagram illustrating an example of a data configuration of a transmission completion list according to an embodiment of the present invention;

FIGS. 8A-8D are schematic diagrams illustrating transition of data of a participant list, a ongoing transmission list, a transmission completion list in a case of performing a data sharing process (part 1) according to an embodiment of the present invention;

FIGS. 11A-11D are schematic diagrams illustrating transition of data of a participant list, an ongoing transmission list, a transmission completion list in a case of performing a data sharing process (part 2) according to an embodiment of the present invention;

FIG. 13 is a flowchart illustrating an example of a process of determining a data obtain target according to an embodiment of the present invention;

DETAILED DESCRIPTION OF THE PREFERRED EMBODIMENTS

<System Configuration>

Figure 1A:
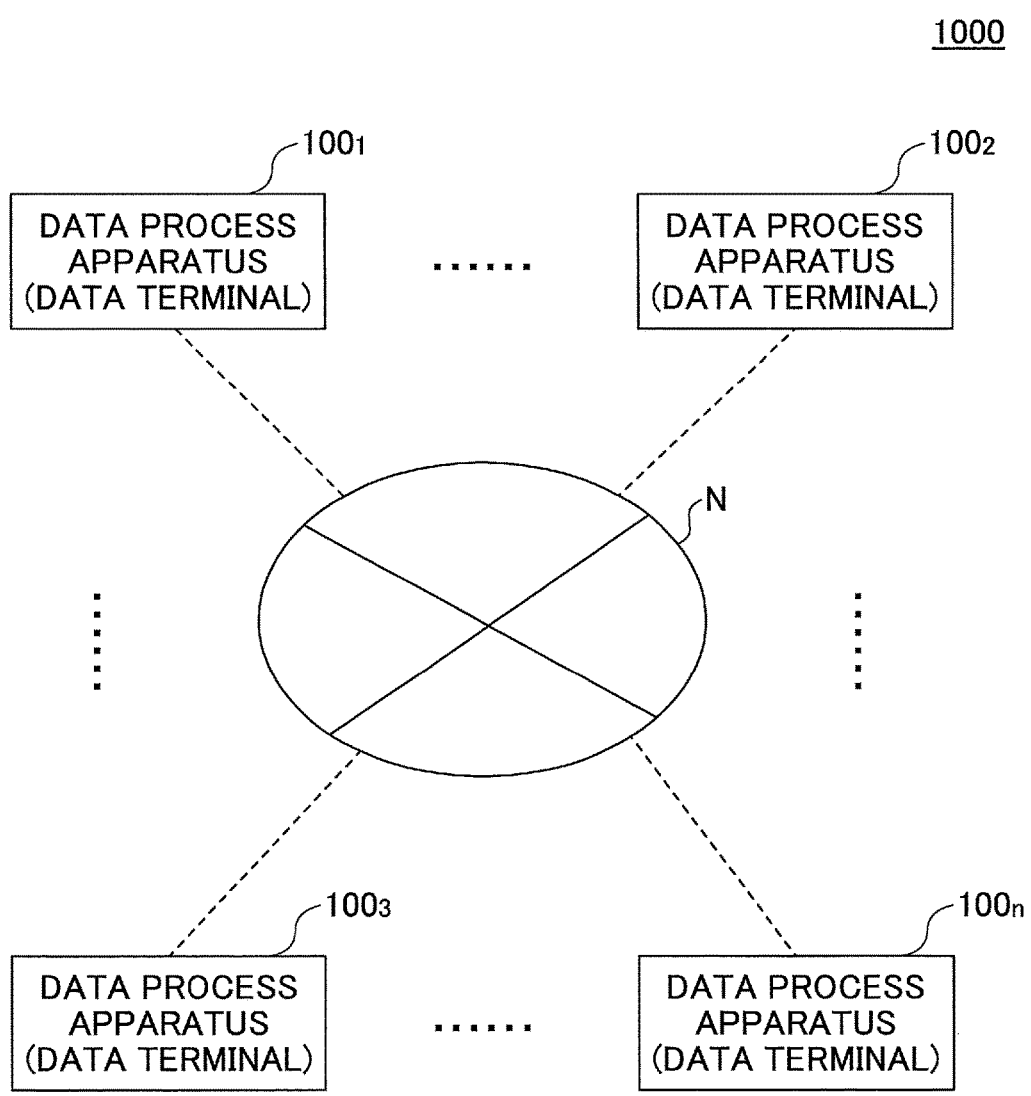
FIGS. 1A and 1B are schematic diagrams for describing a configuration of a data share system according to an embodiment of the present invention.
Figure 1B:
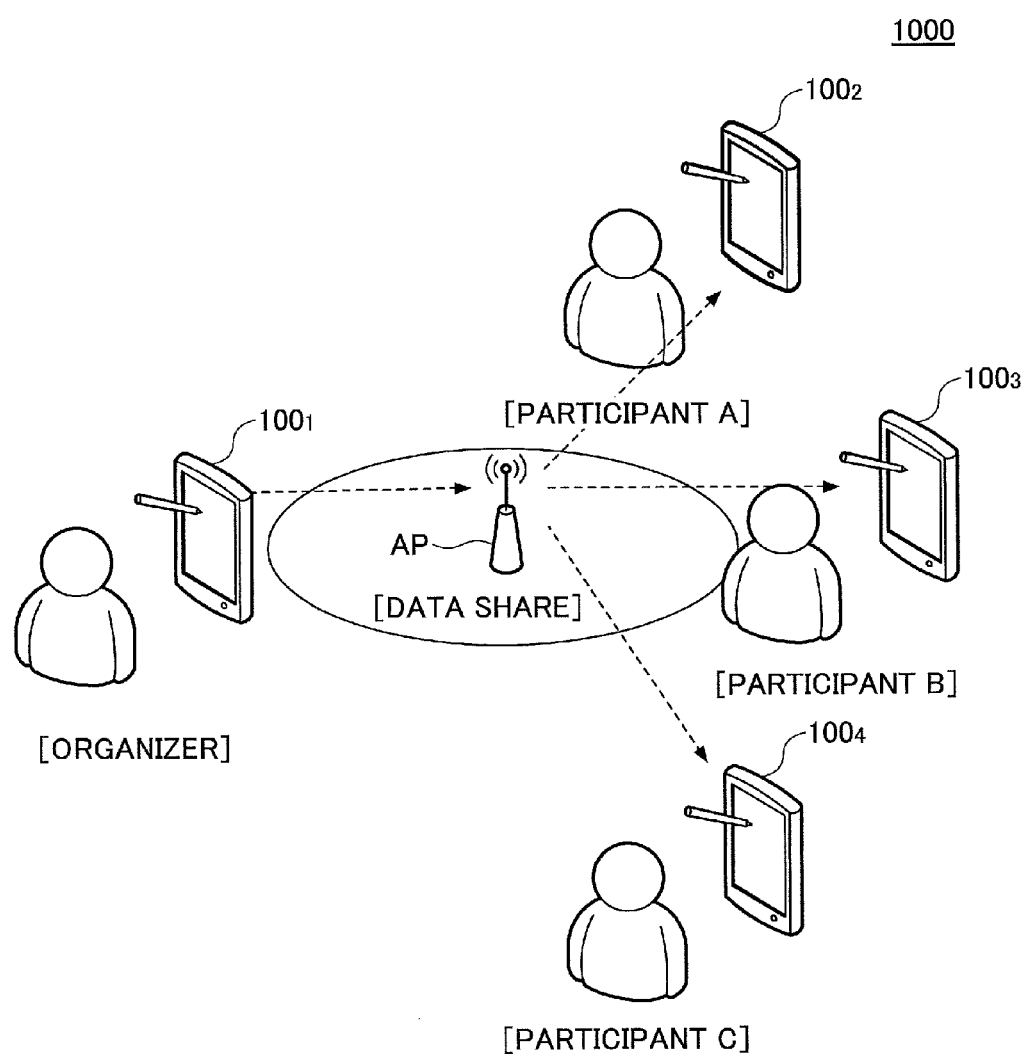

FIGS. 1A and 1B are schematic diagrams for describing a configuration of a data share system 1000 according to an embodiment of the present invention. FIG. 1A illustrates a configuration having multiple data process apparatuses 100a-100n (hereinafter also collectively referred to as "data process apparatus") connected by a data transmission path N (e.g., a Local Area Network (LAN)). In this embodiment, the data share system 1000 is applied to a wireless communication network. The data transmission path N may be, for example, a wireless LAN or a Bluetooth (Registered Trademark) network.

The data process apparatus 100 includes, for example, a wireless communication function, a data input function, and a data display function. Although in this embodiment, the data process apparatus 100 may include a desktop type personal computer (PC), the data process apparatus 100 is preferably a data terminal that is portable such as a smart phone or a tablet type PC.

FIG. 1B illustrates an example where the data share system 1000 according to an embodiment of the present invention is used for a conference. The data share system 1000 is used as follows. It is to be noted that the document data shared by data process apparatuses $100_1$-$100_4$ in the conference is retained (stored) in the data process apparatus $100_1$. The data process apparatus 100 includes a function of allowing a screen (based on shared data) to be shared among the data process apparatuses $100_1$-$100_4$.

First, the organizer of the conference uses the data process apparatus $100_1$ to detect an access point AP located in a conference room of the conference and connect to a network. Thereby, the data process apparatus $100_1$ waits for other data process apparatuses $100_2$-$100_4$ to transmit (send) a participation notification to the data process apparatus $100_1$.

Then, in the state where the data process apparatus $100_1$ is waiting, a participant A uses the data process apparatus $100_2$ to detect the access point AP and connect to the network. Thereby, the data process apparatus $100_2$ transmits a participation notification to the data process apparatus $100_1$ to notify participation to the conference. In response to the participation notification, the data process apparatus $100_1$ notifies device data of the data process apparatus $100_1$ (i.e. device data pertaining to the data process apparatus $100_1$ itself (self device data)) to the data process apparatus $100_2$. Then, the data process apparatus $100_2$ obtains the document data from the data process apparatus $100_1$ based on the self device data notified from the data process apparatus $100_1$ and shares a conference document included in the document data.

Then, another participant B uses the data process apparatus $100_3$ to detect the access point AP and connect to the network. Thereby, the data process apparatus $100_3$ transmits a participation notification to the data process apparatus $100_1$ to notify participation to the conference. In response to the participation notification, the data process apparatus $100_1$ notifies device data pertaining to the data process apparatus $100_2$ that is already sharing the document data (document data obtained device) to the data process apparatus $100_3$. Then, the data process apparatus $100_3$ obtains the document data from the data process apparatus $100_2$ based on the device data notified from the data process apparatus $100_1$ and shares the conference document included in the document data.

Then, another participant C uses the data process apparatus $100_4$ to detect the access point AP and connect to the network. Thereby, the data process apparatus $100_4$ transmits a participation notification to the data process apparatus $100_1$ to notify participation to the conference. In response to the participation notification, the data process apparatus $100_1$ notifies device data pertaining to the data process apparatus $100_3$ that is already sharing the document data (document data obtained device) to the data process apparatus $100_4$. Then, the data process apparatus $100_4$ obtains the document data from the data process apparatus $100_3$ based on the device data notified from the data process apparatus $100_1$ and shares the conference document included in the document data.

Hence, with the data share system 1000 according to the above-described embodiment, any one of the data process apparatuses 100 retaining shared data can be an origin for providing the shared data to a newly participating data process apparatus 100.

Accordingly, the data share system 1000 having the above-described configuration can provide a distributed type data share service among multiple data process apparatuses 100.

The above-described access point (AP) may have a routing function (relay function) that relays data communications between an external network (public area) such as the Internet and an internal network (private area) such as LAN. In a case where the access point (AP) has such routing function, the data share system 1000 can provide a data share service in a wide area.

<Hardware Configuration>

Figure 2:
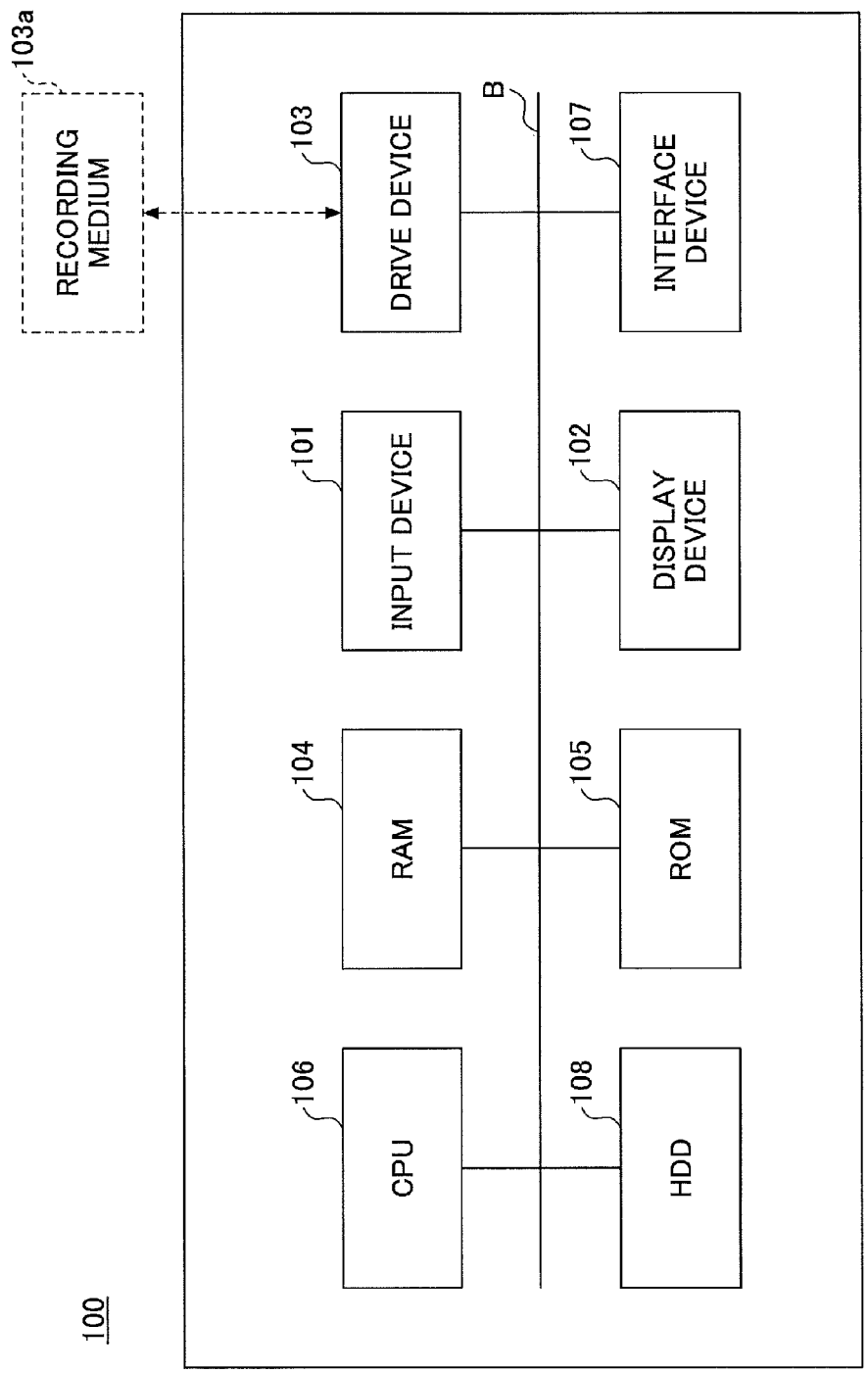
FIG. 2 is a schematic diagram illustrating an example of a hardware configuration of a data process apparatus according to an embodiment of the present invention.

FIG. 2 is a schematic diagram illustrating an example of a hardware configuration of the data process apparatus 100 according to an embodiment of the present invention. As illustrated in FIG. 2, the data process apparatus 100 includes, for example, an input device 101, a display device 102, a drive device 103, a RAM (Random Access Memory) 104, a ROM (Read Only Memory) 105, a CPU (Central Processing Unit) 106, an interface device 107, and a HDD (Hard Disk Drive) 108 that are connected to each other by a bus B.

The input device 101 includes, for example, a touch panel. The input device 101 is used for inputting various operation signals to the data process apparatus 100. The display device 102 includes, for example, a display. The display device 102 displays results of various processes (process results) performed by the data process apparatus 100.

The interface device 107 includes, for example, an interface that connects the data process apparatus 100 to the data transmission path N. Accordingly, the data process apparatus 100 can perform data communications with other data process apparatuses 100 by way of the interface device 107.

The HDD 108 includes, for example, a non-volatile storage device that stores various programs and data. The programs and data stored in the HDD 108 may include basic software (operating system (OS)) of a data process system for control all of the data process apparatuses such as Windows (registered trademark) or UNIX (registered trademark). The programs and data stored in the HDD 108 may also include applications that provide various functions in a system such as an application for executing a data share function. Further, the HDD 108 manages the stored programs and data by using a predetermined file system and/or a database (DB).

The drive device 103 includes, for example, an interface between the data process apparatus 100 and a removable recording medium (computer-readable recording medium) 103a. Accordingly, the data process apparatus 100 reads data from the recording medium 103a and/or writes data to the recording medium 103a by way of the drive device 103. The recording medium 103a includes, for example, an SD (Secure Digital) memory card or a USB (Universal Serial Bus) memory.

The ROM 105 includes, for example, a non-volatile semiconductor memory (storage device) that can retain (store) internal data therein even after the power of the data process apparatus 100 is turned off. The ROM 105 stores programs and data used for executing BIOS (Basic Input/Output System) upon activation of the data process apparatus 100, setting up a data process system, and setting up a network. The RAM 104 includes, for example, a volatile semiconductor memory (storage device) that can temporarily retain (store) data and programs therein. The CPU 106 includes, for example, a processor that controls the entire data process apparatus 100 and executes functions of the data process apparatus 100 by obtaining data and programs from, for example, the HDD 108 or the ROM 105 and loading the data and programs to the RAM (memory) 104, and executing various processes.

With the above-described data process apparatus 100 having the above-described hardware configuration, various data process services can be provided.

<Data Share Function>

Next, a data share function according to an embodiment of the present invention is described.

For example, in a case where one of the data process apparatuses 100 (in this example, also referred to as "organizer device") is used by an organizer organizing an event, the organizer device receives a participation notification(s) indicating participation to the event from one or more other data process apparatuses 100 (in this example, also referred to as "participation requesting device"). The organizer device refers to the data share status and the data transmission status of one or more data process apparatuses (in this example, also referred to as "participating device") whose participation notification(s) has already been received by the organizer device. The organizer device determines a device (data obtain target) from which shared data is to be obtained by the participation requesting device. Then, the organizer device notifies data of the data obtain target to the participation requesting device. Accordingly, the participation requesting device obtains the shared data from the data obtain target. Thereby, the data share function can be provided by the data process apparatus 100 according to the above-described embodiment of the present invention.

In a case where data share is performed among multiple data process apparatus according to a related art example, shared data is provided from a single data process apparatus (server) to other data process apparatus (clients). This results in a problem of large load and long data transmission time. Thus, it is desired to efficiently share data and reduce the workload of sharing data by distributing the workload.

With the data process apparatus 100 according to an embodiment of the present invention, in a case where the organizer device receives a participation request from the participation requesting device, the organizer device notifies data of the participating device as data of the data obtain target and allows the participation requesting device to obtained shared data from the data obtain target.

Accordingly, the data share system 1000 including the data process apparatuses 100 provides an environment where the workload for obtaining shared data is distributed among the data process apparatuses 100. As a result, the data share system 1000 can efficiently perform data and reduce the workload of sharing data.

Next, a configuration of the data share system 1000 and operation for providing the data share function according to an embodiment of the present invention is described in further detail.

Figure 3:
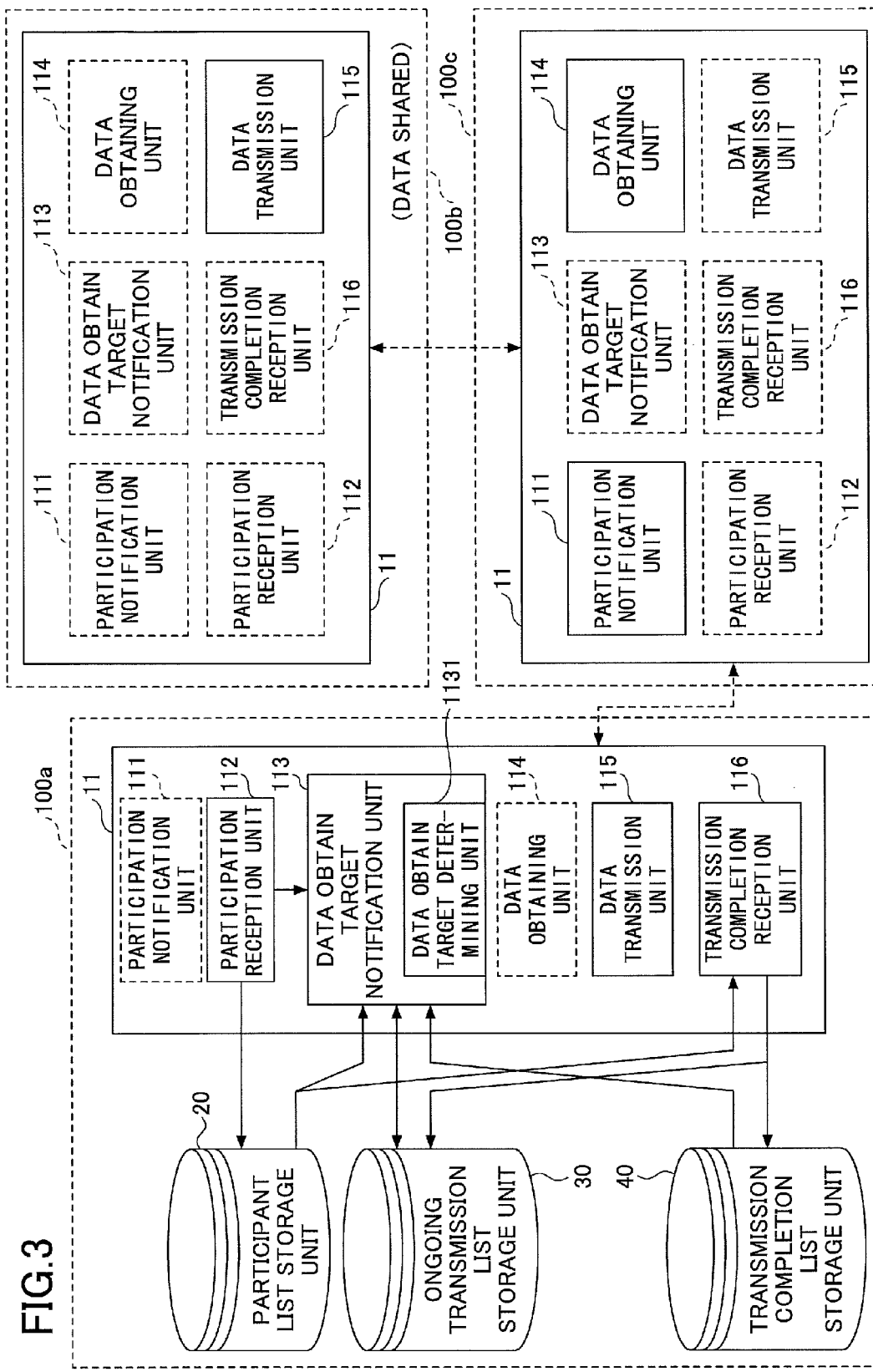
FIG. 3 is a schematic diagram illustrating a configuration of a data share system providing a data share function according to an embodiment of the present invention.

FIG. 3 is a schematic diagram illustrating a configuration of the data share system 1000 providing the data share function according to an embodiment of the present invention. In FIG. 3, reference numeral 100a represents the organizer device (i.e. data process apparatus 100 of an organizer organizing (holding) an event), reference numeral 100b represents the participating device (i.e. data process apparatus 100 of a participant already participating in the event), and reference numeral 100c represents the participation requesting device (i.e. data process apparatus 100 of a participant requesting participation to the event).

As illustrated in FIG. 3, the data process apparatuses 100a, 100b, 100c include a communication control unit 11. The communication control unit 11 includes, for example, various function units for controlling data communication (reception/transmission of data (signals)) among the data process apparatuses 100a, 100b, and 100c. The function units of the communication control unit 11 include a participation notification unit 111, a participation receive unit 112, a data obtain target notification unit 113, a data obtain unit 114, a data transmission unit 115, and a transmission completion receive unit 116. The data share function provided by the data process apparatuses 100a-100c of the data share system 1000 is executed by cooperatively operating the function units of the communication control units 11 in the data process apparatuses 100a-100c.

In this example, mainly the function units illustrated with solid lines are operated to execute the data share function according to an embodiment of the present invention. That is, in order to provide the data share function, the participation receive unit 112, the data obtain target notification unit 113, the data transmission unit 115, and the transmission completion receive unit 116 in the organizer device 100a are operated; the data transmission unit 115 of the participating device 100b is operated; and the participation notification unit 111 and the data obtain unit 114 are operated.

<<Organizer Device>>

First, various data used by the organizer device 100a for controlling communication during a data share process is described.

Figure 6:
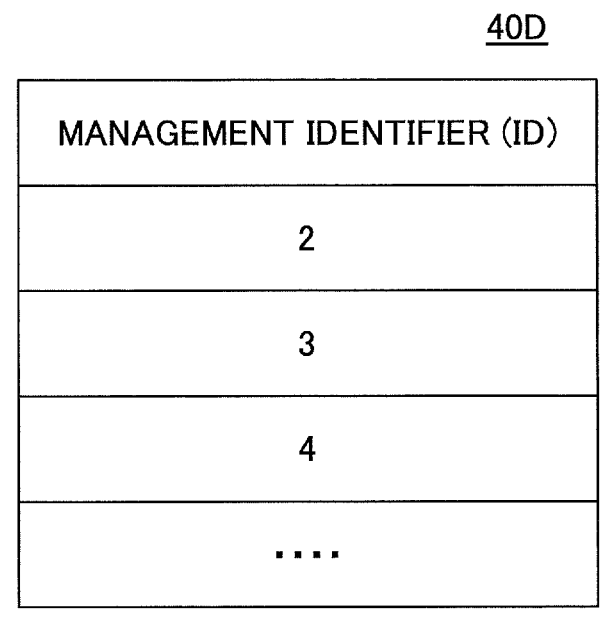

The organizer device 100a retains (stores) various data such as a participant list 20D, an ongoing transmission list 30D, and a transmission completion list 40D (see, for example, FIGS. 4-6).

The participant list 20D includes data for managing the participating device 100b and the participation requesting device 100c. The participant list 20D is recorded and stored in a participant list storage unit 20. The ongoing transmission list 30D includes data for managing a relationship between the participating device 100b (i.e. an origin that transmits shared data (transmitting side), that is, a device that has already obtained shared data) and the participation requesting device 100c (i.e. destination that receives the shared data (receiving side)). The ongoing transmission list 30D is recorded and stored in an ongoing transmission list storage unit 30. The transmission completion list 40D includes data for managing a device (formerly participation requesting device) which has newly become a participating device 100b (i.e. device which has obtained shared data). The transmission completion list 40D is recorded and stored in a transmission completion list storage unit 40.

Each of the storage units 20, 30, 40 may be a predetermined storage space of a storage device (e.g., HDD 108, RAM 104) of the organizer device 100a.

FIG. 4 is a schematic diagram illustrating an example of a data configuration of the participant list 20D according to an embodiment of the present invention.

As illustrated in FIG. 4, the participant list 20D includes one or more data sets in which each set includes data items (e.g., [management identifier], [device identifier]) associated to each other. The organizer device 100a uses the participant list 20D to manage the participating device 100b and the participation requesting device 100c in units of data process apparatuses 100.

The data item [management identifier] of the participant list 20D indicates identification data used for managing participation notifications (hereinafter also referred to as "management identification data"). An item value included in the data item [management identifier] is, for example, a unique management identifier (unique data number) that is issued when the organizer device 100a receives a participation notification. The data items [management identifier] of FIG. 4 are illustrated as ID numbers issued in an order in which participation notifications are received by the organizer device 100a. The data item [device identifier] of the participant list 20D indicates identification data of participation requesting devices 100c (hereinafter also referred to as "device identification data"). An item value included in the data item [device identifier] is, for example, a unique device identifier (setting value) that is pre-assigned (assigned beforehand) to each data process apparatus 100. The data items [device identifier] of FIG. 4 are illustrated as IP (Internet Protocol) addresses (network setting values) assigned to the data process apparatuses 100.

The data items [management identifier] and [device identifier] of the participant list 20D are registered and deleted (managed) in units of data sets.

In a case of registering data to the participant list 20D during a phase (stage) where a participation notification is received, the organizer device 100a associates a data item [management identifier] issued to the participation requesting device 100c and a data item [device identifier] included in device data obtained from the participation requesting device 100c (data obtained upon receiving a participation notification from the participation requesting device 100c) and registers the data item [management identifier] and the data item [device identifier] as a data set based on the order in which the participation notification is received. In a case where the organizer device 100a is in a below-described participation notification waiting state, a data set corresponding to the organizer device 100a itself is also registered.

In a case of deleting data from the participant list 20D, a data set including a combination of the data item [management identifier] and the data item [device identifier] is deleted when the event is ended.

Accordingly, the organizer device 100a manages the participation requesting devices 100b and the participating devices 100b by using the participant list 20D.

FIG. 5 is a schematic diagram illustrating an example of a data configuration of the ongoing transmission list 30D according to an embodiment of the present invention.

As illustrated in FIG. 5, the ongoing transmission list 30D includes one or more data sets in which each set includes two data items of [management identifier] associated to each other. The organizer device 100a uses the ongoing transmission list 30D to manage a transmission/reception relationship between a transmitting device and a receiving device during a data sharing process in units of the transmission/reception relationships.

The data item [management identifier] of the ongoing transmission list 30D indicates management identification data that is issued when the organizer device 100a receives a participation notification. More specifically, for example, one data item [management identifier] indicates management identification data corresponding to a participating device 100b (which has already obtained shared data) which is a transmission origin of the shared data (hereinafter also referred to as "management identification data of a below-described transmission origin device") and another data item [management identifier] indicating management identification data corresponding to a participation requesting device 100c which is a transmission destination of the shared data (hereinafter also referred to as "management identification data of a below-described transmission destination device").

The data item [management identifier] of the transmission origin and the data item [management identifier] of the transmission destination are registered and deleted (managed) in units of data sets.

In a case of registering data to the ongoing transmission list 30D during a phase (stage) where a data sharing process (data transmission) is being performed, the organizer device 100a associates a data item [management identifier] corresponding to a participating device 100b which is to be the transmission origin (hereinafter also referred to as "transmission origin device") and a data item [management identifier] corresponding to a participation requesting device 100c which is to be the transmission destination (hereinafter also referred to as "transmission destination device") and registers the item value of the data item [management identifier] of the transmission origin device and the item value of the data item [management identifier] of the transmission destination device as a data set that includes management identification data of the transmission origin device and the transmission destination device.

In a case of deleting data from the ongoing transmission list 30D, a data set including a combination of the data item [management identifier] of the transmission origin device and the data item [management identifier] of the transmission destination device is deleted when the transmission of shared data from the transmission origin device to the transmission destination device is completed.

Accordingly, the organizer device 100a manages the data transmission/reception relationship between the participating device 100b (transmission origin device) and the participating requesting device 100c (transmission destination device) during a data sharing process by using the ongoing transmission list 30D.

FIG. 6 is a schematic diagram illustrating an example of a data configuration of the transmission completion list 40D according to an embodiment of the present invention.

As illustrated in FIG. 6, the transmission completion list 40D includes data items [management identifier]. The organizer device 100a uses the transmission completion list 40D to manage participating devices 100b in units of data process apparatuses 100.

The data item [management identifier] of the transmission completion list 40D indicates management identification data that is issued when the organizer device 100a receives a participation notification. More specifically, for example, data item [management identifier] of the transmission completion list 40D indicates management identification data corresponding to a participation requesting device 100c (which has completed obtaining of shared data) (hereinafter also referred to as "management identification data of a below-described transmission completed device").

The data items [management identifier] of the transmission completion list is registered and deleted (managed) in units of data items [management identifier].

In a case of registering data to the transmission completion list 40D during a phase (stage) where data transmission is completed, the organizer device 100a registers a management identifier corresponding to the participation requesting device (transmission destination device) 100c as an item value of the data item [management identifier] including management identification data of the transmission completed device.

In a case of deleting data from the transmission completion list 40D, the data item [management identifier] is deleted when the event is ended.

Accordingly, the organizer device 100a manages participation requesting devices 100c which have become participating devices 100b that have obtained shared data (transmission completed device).

Returning to the description of the configuration of FIG. 3, the participation receive unit 112 is a function unit that receives a participation notification from the participation requesting device 100c. The participation receive unit 112 receives the participation notification, for example, by receiving device data (signal) from the participation requesting device 100c. When the participation receive unit 112 receives the participation notification, the participation receive unit 112 accesses the participant list storage unit 20 and registers the management identification data and the device identification data corresponding to the participation requesting device 100c to the participant list 20D.

The data obtain target notification unit 113 is a function unit that notifies a data obtain target from which shared data is to be obtained by the participation requesting device 100c. The data obtain target notification unit 113 determines a participating device 100b (data obtain target) from which shared data is to be obtained by the participation requesting device 100c and notifies the determined data obtain target (participating device) to the participation requesting device 100c. The determining of the data obtain target is executed by a data obtain target determining unit 1131 included in the data obtain target notification unit 113.

The data obtain target determining unit 1131 determines a device (data obtain target) from one or more participating devices 100b that has already obtained shared data based on, for example, data sharing status of the participating devices 100b and the transmission status of the participating devices 100b. An example of the determining process is described as follows.

When the participation receive unit 112 receives a participation notification, the data obtain target determining unit 1131 accesses the ongoing transmission list storage unit 30 and the transmission completion list storage unit 40. The data obtain target determining unit 1131 refers to the transmission completion list 40D and obtains the management identification data of the transmission completed device that is registered in the transmission completion list 40D. Further, the data obtain target determining unit 1131 refers to the ongoing transmission list 30D and searches through the data items [management identifier] (management identification data of transmission origin device). The data obtain target determining unit 1131 designates (identifies) the management identification data of a transmission completed device which is not registered as transmission origin device according to the search results (i.e. results of searching whether there is management identification data of a corresponding device).

For example, the data obtain target determining unit 1131 designates a participating device 100b, which has already obtained shared data and is not transmitting data, from the device(s) found in the search. Thereby, the designated participating device 100b is determined as the data obtain target from which shared data is to be obtained by the participation requesting device 100c. In other words, a participating device 100b, which has already obtained shared data (having shared data stored therein) and is not transmitting shared data to another data process apparatus 100, is designated from the participating devices 100b. In addition, the participating device 100b may be designated in view of the work load of transmitting shared data to the participation requesting device 100c. Thus, a participating device 100b, which has less work load in transmitting shared data to the participation requesting device 100c compared to the other participating device(s) 100b, may be designated and determined as the data obtain target.

In a case where the data obtain target determining unit 1131 is unable to designate the participating device 100b which has already obtained shared data and is not transmitting data, the data obtain determining unit 1131 determines the organizer device 100a as the data obtain target. In a case where the data obtain target determining unit 1131 designates multiple participating devices 100b, the participating device 100b participating earliest in the event (i.e. having the earliest participation order) among the multiple participating devices 100b is determined as the data obtain target. The participation order to the event may be determined based on, for example, the order of the management identification data issued according to the participation order (order in which the participation notification is received) or the order in which management identification data is registered (listed order) in the participant list 20D.

The data obtain target notification unit 113 notifies the participating device 100b determined by the data obtain target determining unit 1131 to the participation requesting device 100c. More specifically, the data obtain target notification unit 113 accesses the participant list storage unit 20 when the participating device 100b is determined. Then, the data obtain target notification unit 113 refers to the participant list 20D based on the management identification data corresponding to the determined participating device 100b. When the data obtain target notification unit 113 finds management identification data that matches the management identification data corresponding to the determined participating device 100b, the data obtain target notification unit 113 obtains device identification data associated to the matching management identification data (device identification data of a corresponding data set). Then, the data obtain target notification unit 113 notifies the data obtain target by transmitting the obtained device identification data to the participation requesting device 100c.

With the data share function according to the above-described embodiment, the organizer device 100a, upon receiving a participation request from the participation requesting device 100c, notifies the participating device 100b having already obtained shared data as the data obtain target to the participation requesting device 100c, so that the shared data can be obtained from the notified participating device 100b.

Further, in a case where the data obtain target notification unit 113 notifies the data obtain target to the participation requesting device 100c, the data obtain target notification unit 113 registers a data set to the ongoing transmission list 30D. The data set includes the management identification data corresponding to the participating device 100b determined as the data obtain target and the management identification data corresponding to the participation requesting device 100c to which the data obtain target is notified. Thereby, the organizer device 100a can manage a new data transmission/reception relationship between the participating device 100b (transmission origin device) and the participating requesting device 100c (transmission destination device) during a data sharing process by using the ongoing transmission list 30D.

The data transmission unit 115 is a function unit that transmits shared data in response to a data obtain request from the participation requesting device 100c. It is to be noted that the data transmission unit 115 of the organizer device 100a transmits shared data in a case where the organizer device 100a is determined as the data obtain target by the data obtain target determining unit 1131.

In a case where the data obtain request is received, the data transmission unit 115 responds to the data obtain request by transmitting shared data stored in a predetermined storage space to the participation requesting device 100c. The predetermined storage space may be, for example, a predetermined storage space in a storage device of the organizer device 100a.

After the data transmission unit 115 completes transmitting the shared data, the data transmission unit 115 notifies that transmission of the shared data is completed to the transmission completion receive unit 116.

The transmission completion receive unit 116 is a function unit that receives a completion notification notifying the completion of data transmission during a data sharing process. The transmission completion receive unit 116 receives the completion notification by receiving device identification data of the transmission origin device and device identification data of the transmission destination device from the data transmission unit 115.

In a case where the data sharing process between the participating device 100b (determined as the data obtain target) and the participation requesting device 100c is completed, the transmission completion receive unit 116 receives a completion notification of the data transmission (device identification data of the participating device 100b and the device identification data of the participation requesting device 100c) from the participating device 100b (data transmission unit 115 of the participating device 100b. Further, in a case where the data sharing process between the organizer device 100a (determined as the data obtain target) and the participation requesting device 100c is completed, the transmission completion receive unit 116 receives a completion notification of the data transmission (device identification data of the organizer device 100a and the device identification data of the participation requesting device 100c) from the data transmission unit 115 of the organizer device 100a.

When the transmission completion receive unit 116 receives the completion notification of the data transmission, the transmission completion receive unit 116 accesses the transmission completion list storage unit 40 and registers the management identification data corresponding to the participation requesting device 100c which has obtained shared data (i.e. transmission completed device) to the transmission completion list 40D. More specifically, in registering the management identification corresponding to the participation requesting device 100c, the transmission completion receive unit 116 accesses the participant list storage unit 20. Then, the transmission completion receive unit 116 refers to the participant list 20D based on the device identification data of the participation requesting device 100c included in the completion notification. When the transmission completion receive unit 116 finds device identification data that matches the device identification data of the participation requesting device 100c, the transmission completion notification unit 116 obtains management identification data associated to the matching device identification data (management identification data of a corresponding data set). Thereby, the organizer device 100a can manage the transmission completed devices with the transmission completion list 40D.

Further, when the transmission completion receive unit 116 receives the completion notification of the data transmission, the transmission completion receive unit 116 accesses the ongoing transmission list storage unit 30 and deletes the data set including the management identification data of the transmission origin device and the transmission destination device (which have completed the data sharing process) from the ongoing transmission list 30D. More specifically, in deleting the data set, the transmission completion receive unit 116 accesses the ongoing transmission list storage unit 30. Then, the transmission completion receive unit 116 refers to the ongoing transmission list 30D based on the management identification data of the transmission origin device (participating device 100b) and the management identification data of the transmission destination device (participation requesting device 100c) obtained when registering the management identification data to the transmission completion list 40D. When the transmission completion receive unit 116 finds management identification data that matches the management identification data of the transmission destination device and the management identification data of the transmission origin device associated to the management identification data of the transmission destination device (corresponding data set), the transmission completion notification unit 116 deletes the management identification data of both the transmission origin device and the transmission destination device (corresponding data set) from the ongoing transmission list 30D. Thereby, the organizer device 100a can manage the transmission completed devices with the transmission completion list 40D. It is to be noted that the management identification data of the transmission origin device may be obtained with the same method as obtaining the management identification data of the transmission destination data.

<<Participating Device>>

In a case where the data transmission unit 115 of the participating device 100b receives a data obtain request from the participation requesting device 100c, the data transmission unit 115 responds by transmitting shared data stored in a predetermined storage space of a storage device of the participating device 100b to the participation requesting device 100c.

After the data transmission unit 115 completes transmitting the shared data to the participation requesting device 100c, the data transmission unit 115 notifies completion of the transmission of the shared data (completion notification) to, for example, the organizer device 100a (transmission completion receive unit 116).

It is to be noted that the destination of the completion notification transmitted by the data transmission unit 115 differs according to the data process apparatus 100 (operation environment) in which the data transmission unit 115 operates. That is, the destination of the completion notification differs depending on whether the data process apparatus 100 is the organizer device 100a or the participating device 100b. Accordingly, the data transmission unit 115 switches the destination of the completion notification in accordance with the operation environment of the data transmission unit 115. For example, first, the data transmission unit 115 determines whether the operation environment of the data transmission unit 115 itself is the organizer device 100a or the participating device 100b. In a case where the operation environment of the data transmission unit 115 is the participating device 100b, the data transmission unit 115 sets the destination of the completion notification to the organizer device 100a. On the other hand, in a case where the operation environment of the data transmission unit 115 is the organizer device 100a, the data transmission unit 115 sets the destination of the completion notification to the transmission completion receive unit 116 of the organizer device 116. The operation environment may be determined based on, for example, whether each of the participant list 20, the ongoing transmission list 30, and the transmission completion storage list 40 is stored in the data process apparatus 100.

<<Participation Requesting Device>>

The participation notification unit 111 is a function unit that notifies participation to an event. When the participation requesting device 100c detects a network of an event and succeeds in connecting to the network, the participation notification unit 111 of the participation requesting device 100c notifies participation to the organizer device 100a (participation receive unit 112).

The data obtain unit 114 is a function unit that request obtaining of shared data. The data obtain unit 114 of the participation requesting unit 11c request obtaining of shared data to the organizer device 100a or the participating device 100b notified as the data obtain target by the organizer device 100a (data obtain target notification unit 113). Then, the data obtain unit 114 accesses the organizer device 100a or the participating device 100b based on, for example, device identification data received from the data obtain target notification unit 113 and requests obtaining of shared data.

Hence, with the data share function according to the above-described embodiment, the workload for obtaining shared data is distributed among the data process apparatuses 100.

The data share function according to the above-described embodiment is performed by cooperatively operating the above-described function units. It is to be noted that each of the function units are operated by a data share program (software having a data share function) installed in one or more data process apparatuses 100 constituting the data share system 1000 in which the data share program is loaded from a storage device (e.g., HDD 108, ROM 105) of the data process apparatus 100 or a computer-readable recording medium (e.g., 103a) to a memory (e.g., RAM 104) of the data process apparatus 100 and executed by a processor (e.g., CPU 106) of the data process apparatus 100.

<<Data Sharing Process>>

The data sharing process according to an embodiment of the present invention is performed in two instances of the data share system 1000.

In one instance, the data sharing process is performed when the organizer device 100a, being a participation notification waiting state, receives a participation notification from a participation requesting device 100c in a case where there is no participating device 100b in the data share system 1000 (receiving a participation notification for the first time).

In another instance, the data sharing process is performed when the organizer device 100a, being in a participation notification waiting state, receives a participation notification from a participation requesting device 100c in a case where there is a participating device 100b in the data share system 1000 (receiving another participation notification after receiving the participation request for the first time).

Next, the data sharing process is described with respect to each instance. In the following, the organizer device 100a (i.e. data process apparatus 100 of the organizer of an event) is indicated as device [1] $100_1$, the participating device 100b or the participation requesting device 100c is indicated as device [2] $100_2$ or device [3] $100_3$ for the sake of convenience.

Figure 7:
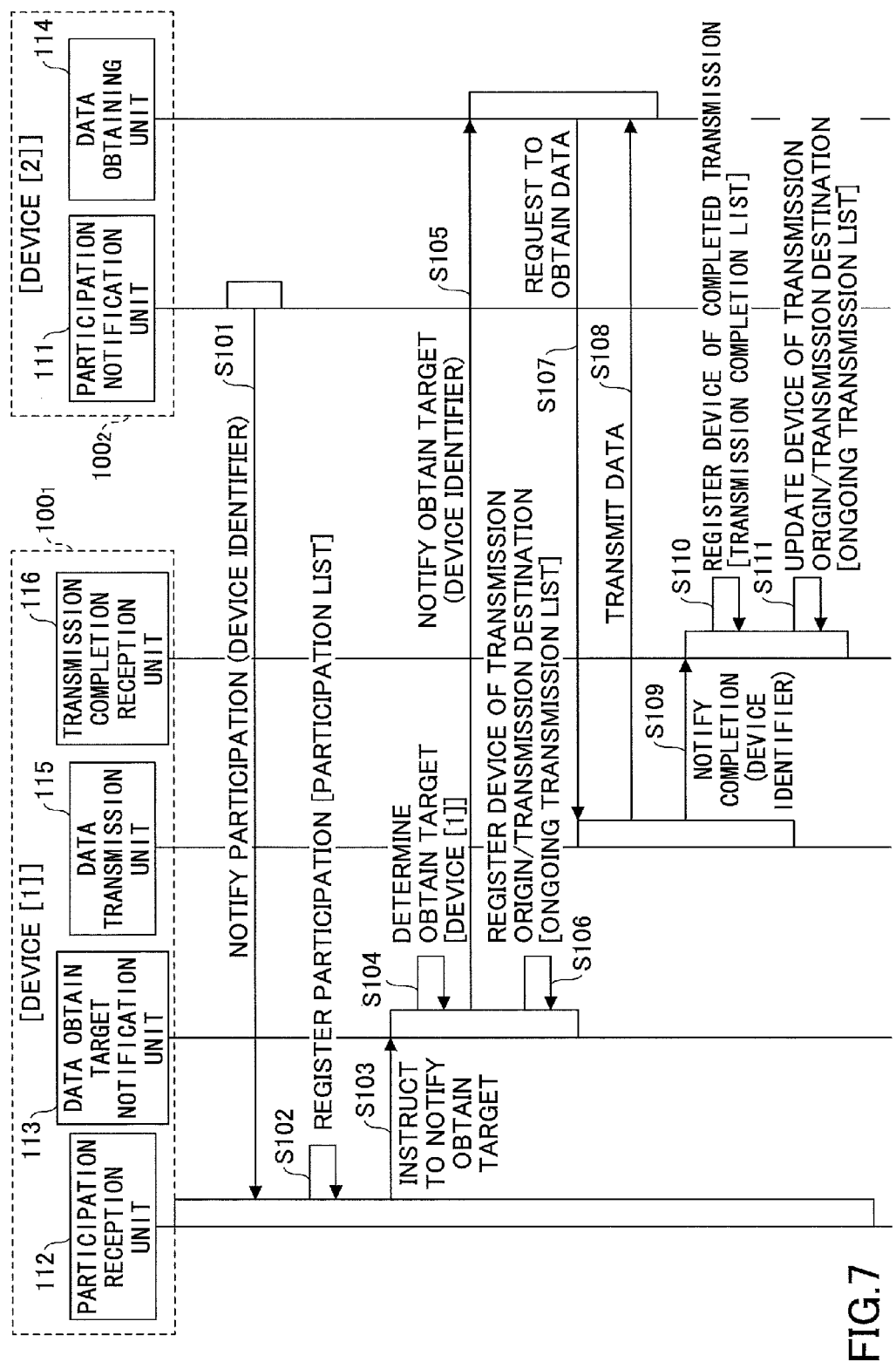
FIG. 7 is a sequence diagram illustrating steps in a case of performing a data sharing process (part 1) according to an embodiment of the present invention.

[Instance 1]: Case Where an Organizer Device Receives a Participation Notification for the First Time FIG. 7 is a sequence diagram illustrating steps in a case of performing a data sharing process (part 1) according to an embodiment of the present invention. FIGS. 8A-8D are schematic diagrams illustrating transition of data of the participant list 20D, the ongoing transmission list 30D, the transmission completion list 40D in a case of performing the data sharing process (part 1) according to an embodiment of the present invention.

As illustrated in FIG. 7, the participation receive part 112 of the device [1] $100_1$ receives a participation notification indicating participation to an event from the participation notification unit 111 of the device [2] $100_2$ (Step S101). In this step, the participation notification unit 111 transmits device data of the device [2] $100_2$ together with the participation request to the participation receive part 112 of the device [1] $100_1$.

When the device [1] $100_1$ receives the participation notification, the function units of the device [1] $100_1$ performs the following steps.

First, the participation receive unit 112 registers the device [2] $100_2$ to the participant list 20D (Step S102). In this step, the participation receive unit 112 accesses the participant list storage unit 20 and refers to the participant list 20D. The participation receive unit 112 registers a new data set that includes management identification data (ID value) issued to the device [2] $100_2$ upon reception of the participation notification and device identification data (IP address) obtained from the device [2] $100_2$. As a result, there is a transition of data in the participant list 20D as illustrated in FIG. 8A. More specifically, the transition of data is described as follows.

First, an ID value 1' of the device [1] $100_1$ and an IP address' 192.168.11.010' of the device [1] $100_1$ are already registered in the participant list 20D. In this state, when Step S102 is executed, an ID value 2' of the device [2] $100_2$ and an IP address' 192.168.11.011' of the device [2] $100_2$ are registered as data indicating a new participation requesting device 100c.

Then, returning to FIG. 7, the participation receive unit 112 instructs the data obtain target notification unit 113 to notification a data obtain target to the device [2] $100_2$ (Step S103).

In response to the instruction from the participation receive unit 112, the data obtain target notification unit 113 refers to the lists 20D, 30D, and 40D and determines the data obtain target based on, for example, a data sharing status and/or a data transmitting status of a participating device 100b (Step S104). As a result, the data obtain target notification unit 113 determines the device [1] $100_1$ as the data obtain target because there is not one participating device. The process of determining the data obtain target is described below in further detail with reference to FIG. 13.

The data obtain target notification unit 113 notifies the determined data obtain target to the device [2] $100_2$ (Step S105). In this step, the data obtain target notification unit 113 transmits the data identification data (IP address) of the device [1] $100_1$ which has been determined as the data obtain target.

Then, the data obtain target notification unit 113 registers the device [1] $100_1$ (i.e. device determined as data obtain target) in association with the device [2] $100_2$ (i.e. device of transmission destination (participation requesting device 100c)) to the ongoing transmission list 30D (Step S106). In this step, the data obtain target notification unit 113 accesses the ongoing transmission list storage unit 30 and refers to the ongoing transmission list 30D. Then, the data obtain target notification unit 113 registers a new data set including the management identification data (ID value) of the device [1] $100_1$ and the management identification data (ID value) of the device [2] $100_2$ to the ongoing transmission list 30D. As a result, there is a transition of data in the ongoing transmission list 30D as illustrated in FIG. 8B. More specifically, the transition of data is described as follows.

First, the values of the data items of the ongoing transmission list 30D are null because there is no ongoing communication (transmission/reception) of shared data being currently performed. Therefore, in this state, when Step S106 is executed, an ID value 1' of the device [1] $100_1$ (transmission origin) and an ID value 2' of the device [2] $100_2$ (transmission destination) are registered as data indicating a new transmission/reception relationship between a device of the transmission origin (transmitting device) and a device of the transmission destination (receiving device).

Then, returning to FIG. 7, the data obtain unit 114 of the device [2] $100_2$ requests the device [1] $100_1$ (data transmission unit 115) to obtain shared data (Step S107). In this step, the data obtain unit 114 accesses the device [1] $100_1$ based on the device identification data (IP address) obtained upon receiving the notification of the data obtain target and obtains shared data from the data transmission unit 115.

In response to the request from the data obtain unit 114, the data transmission unit 115 of the device [1] $100_1$ transmits the shared data to the device [2] $100_2$ (data obtain unit 114) (Step S108).

Then, the data transmission unit 115 notifies completion of the transmission of the shared data to the transmission completion receive unit 116 (Step S109). In this step, the data transmission unit 115 provides the device identification data (IP address) of the device [1] $100_1$ (transmitting device) and the device identification data (IP address) of the device [2] $100_2$ (receiving device).

In response to the notification from the data transmission unit 115, the transmission completion receive unit 116 registers the device [2] $100_2$ that has obtained the shared data (transmission completed device) to the transmission completion list 40D (Step S110). In this step, the transmission completion receive unit 116 accesses the participant list storage unit 20, refers to the participant list 20D based on the device identification data (IP address) obtained from the data transmission unit 115, and obtains the management identification data (ID value) of the device [1] $100_1$ (transmitting device) and the management identification data (IP value) of the device [2] $100_2$ (receiving device). Further, the transmission completion receive unit 116 accesses the transmission completion list storage unit 40 and refers to the transmission completion list 40D. The transmission completion receive unit 116 registers new data indicating the management identification data (ID value) of the device [2] $100_2$ obtained from the data transmission unit 15 to the transmission completion list 40D. As a result, there is a transition of data in the transmission completion list 40D as illustrated in FIG. 8C. More specifically, the transition of data is described as follows.

First, an ID value 1' of the device [1] $100_1$ is already registered in the transmission completion list 40D. In this state, when Step S110 is executed, an ID value 2' of the device [2] $100_2$ is registered as data indicating a new transmission completed device.

Then, returning to FIG. 7, the transmission completion receive unit 116 updates the ongoing transmission list 30D in accordance with the status of the data sharing (transmission) between the device [1] $100_1$ and the device [2] $100_2$ (Step S111). In this step, the transmission completion receive unit 116 accesses the ongoing transmission list storage unit 30, refers to the ongoing transmission list 30D based on the management identification data (ID value) of the device [1] $100_1$ (transmitting device) and the management identification data (ID value) obtained from the data transmission unit 115, and identifies a data set including corresponding (matching) management identification data. Then, the transmission completion receive unit 116 deletes the identified data set and updates the ongoing transmission list 30D. As a result, there is a transition of data in the ongoing transmission completion list 30D as illustrated in FIG. 8D. More specifically, the transition of data is described as follows.

First, the ID value 1' of the device [1] $100_1$ (transmitting device) and the ID value 2' of the device [2] $100_2$ (receiving device) which have performed transmission/reception of shared data are registered in the ongoing transmission list 30D. In this state, when Step S111 is executed, a corresponding data set that includes the ID value 1' of the device [1] $100_1$ (transmitting device) and the ID value 2' of the device [2] $100_2$ (receiving device) is deleted from the ongoing transmission list 30D, so that the values of the data items in the ongoing transmission list 30D becomes null. Thereby, the data indicating the transmission/reception relationship between the transmitting device and the receiving device is updated.

Figure 9:
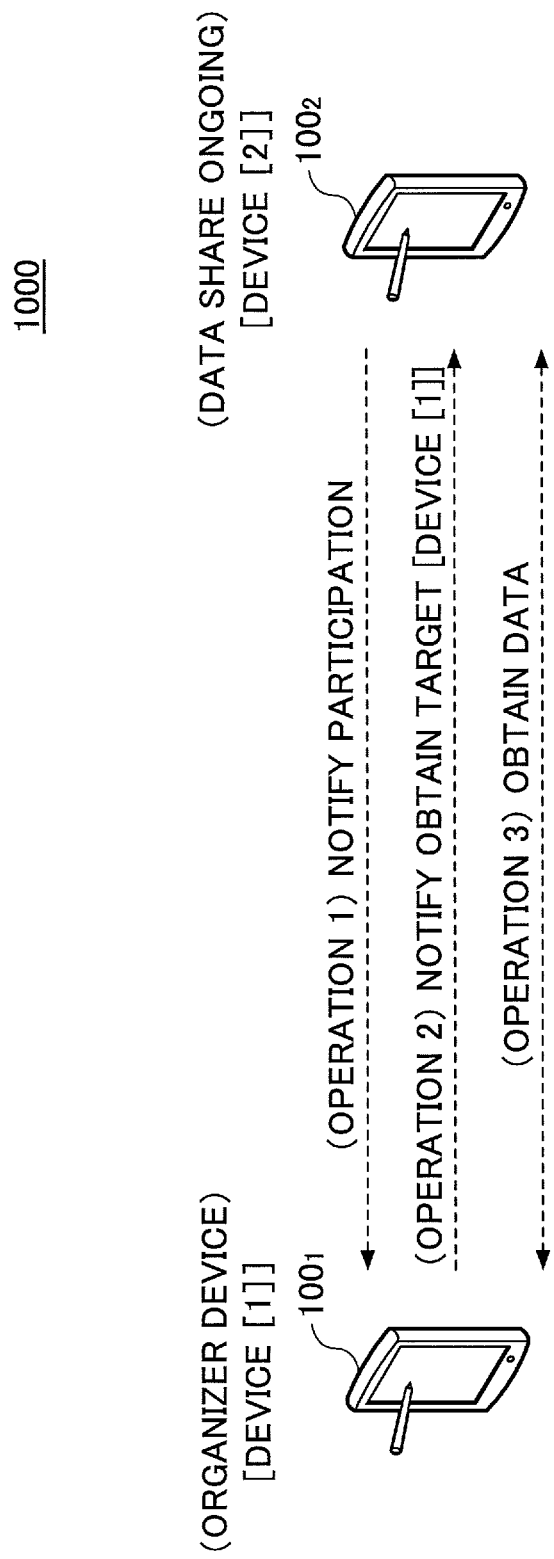
FIG. 9 is a schematic diagram illustrating operations performed in a data sharing operation (part 1) according to an embodiment of the present invention.

Hence, with the data share system 1000 according to the above-described embodiment, a data sharing process including operations (actions) illustrated in FIG. 9 can be performed by the data sharing process of FIG. 7.

FIG. 9 is a schematic diagram illustrating actions performed in a data sharing operation (part 1) according to an embodiment of the present invention. First, when the device [1] $100_1$ waiting for a participation notification receives a participation notification from the device [2] $100_2$ (operation 1), the device [1] $100_1$ notifies to the device [2] $100_2$ that the device [1] $100_1$ (organizer device) is the data obtain target from which shared data is to be obtained (operation 2). Then, the device [2] $100_2$ becomes a state where data sharing (obtaining shared data) with respect to the device [1] $100_1$ is ongoing (operation 3).

Figure 10:
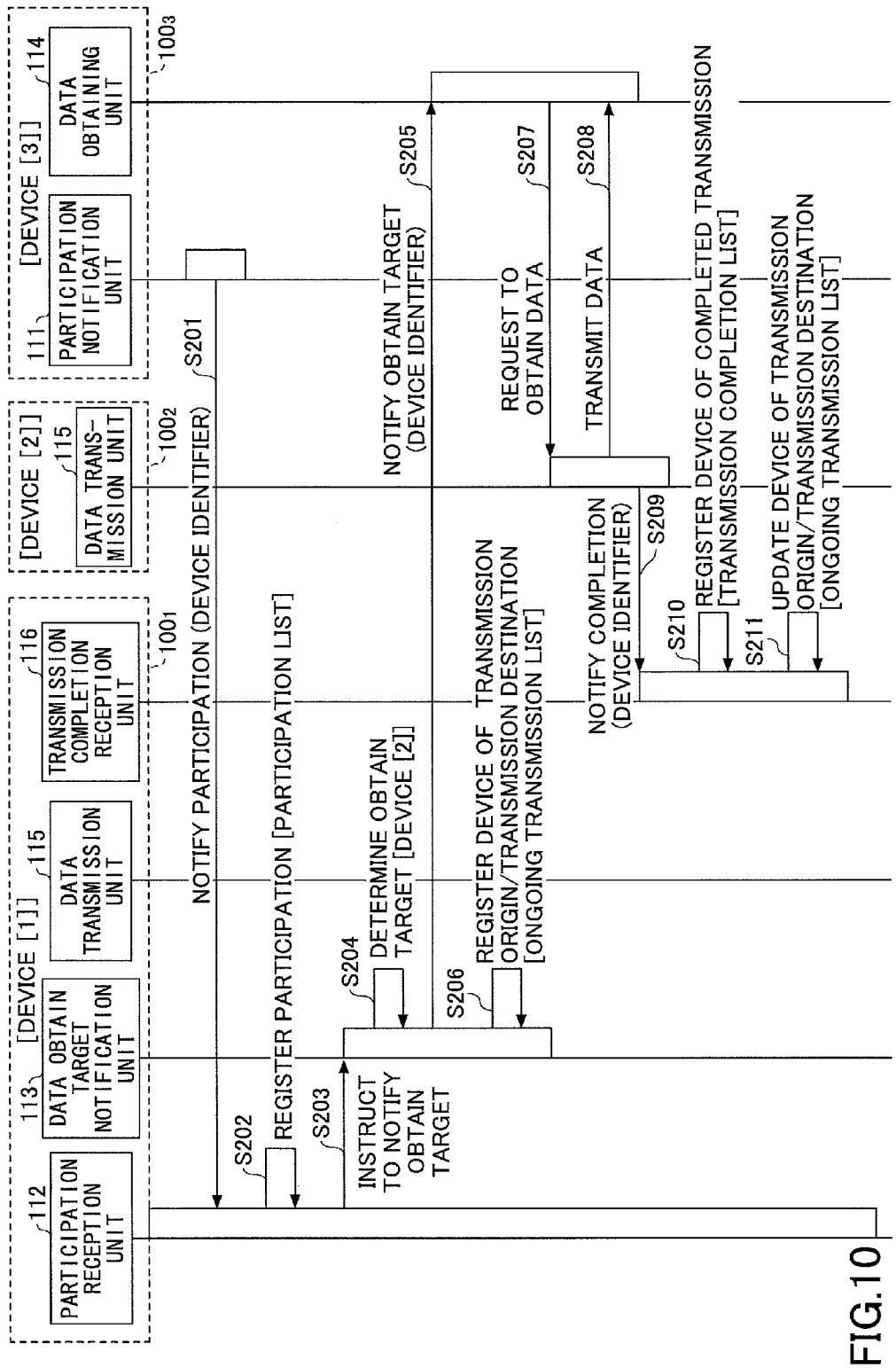
FIG. 10 is a sequence diagram illustrating steps performed in a case of performing a data sharing process (part 2) according to an embodiment of the present invention.

[Instance 2]: Case Where an Organizer Device Receives a Next Participation Notification FIG. 10 is a sequence diagram illustrating steps performed in a case of performing a data sharing process (part 2) according to an embodiment of the present invention. FIGS. 11A-11D are schematic diagrams illustrating transition of data of the participant list 20D, the ongoing transmission list 30D, the transmission completion list 40D in a case of performing the data sharing process (part 2) according to an embodiment of the present invention.

The data sharing process illustrated in FIG. 10 illustrates steps that are performed after the data sharing process of FIG. 7. In other words, FIG. 10 illustrates processes performed in a case where the device [3] $100_3$ (a new participation requesting device 100c) is connected to the data share system 1000 having the device [2] $100_2$ (participating device 100b that has already obtained shared data) connected to the device [1] $100_1$ (organizer device 100a). In the following description of the data sharing process of FIG. 10, the steps similar to those of the FIG. 7 are not described in further detail.

When the device [1] $100_1$ receives a participation notification, the function units of the device [1] $100_1$ performs the following steps.

First, the participation receive unit 112 registers the device [3] $100_3$ to the participant list 20D (Step S202). In this step, the participation receive unit 112 registers a new data set that includes management identification data (ID value) issued to the device [3] $100_3$ upon reception of the participation notification and device identification data (IP address) obtained from the device [3] $100_3$. As a result, there is a transition of data in the participant list 20D as illustrated in FIG. 11A. More specifically, the transition of data is described as follows.

First, the ID value 1' of the device [1] $100_1$ and the IP address' 192.168.11.010' of the device [1] $100_1$ and the ID value 2' of the device [2] $100_2$ and the IP address' 192.168.11.011' of the device [2] $100_2$ are already registered in the participant list 20D. In this state, when Step S202 is executed, an ID value 3' of the device [3] $100_3$ and an IP address' 192.168.11.012' of the device [3] $100_3$ are registered as data indicating a new participation requesting device 100c.

Then, returning to FIG. 10, the participation receive unit 112 instructs the data obtain target notification unit 113 to notify a data obtain target to the device [3] $100_3$ (Step S203).

In response to the instruction from the participation receive unit 112, the data obtain target notification unit 113 refers to the lists 20D, 30D, and 40D and determines the data obtain target based on, for example, a data sharing status and/or a data transmitting status of a participating device 100b (Step S204). As a result, because the device [2] $100_2$ is a participating device that has already obtained shared data (i.e. participating device 100b), the data obtain target notification unit 113 determines the device [2] $100_2$ as the data obtain target. The process of determining the data obtain target is described below in further detail with reference to FIG. 13.

The data obtain target notification unit 113 notifies the determined data obtain target to the device [3] $100_3$ (Step S205). In this step, the data obtain target notification unit 113 transmits the data identification data (IP address) of the device [2] $100_2$ which has been determined as the data obtain target.

Then, the data obtain target notification unit 113 registers the device [2] $100_2$ (i.e. device determined as data obtain target) in association with the device [3] $100_3$ (i.e. device of transmission destination (participation requesting device 100c)) to the ongoing transmission list 30D (Step S206). In this step, the data obtain target notification unit 113 registers a new data set including the management identification data (ID value) of the device [2] $100_2$ and the management identification data (ID value) of the device [3] $100_3$ to the ongoing transmission list 30D. As a result, there is a transition of data in the ongoing transmission list 30D as illustrated in FIG. 11B. More specifically, the transition of data is described as follows.

First, the values of the data items of the ongoing transmission list 30D are null because there is no ongoing communication (transmission/reception) of shared data being currently performed. Therefore, in this state, when Step S206 is executed, an ID value 2' of the device [2] $100_2$ (transmission origin) and an ID value 3' of the device [3] $100_3$ (transmission destination) are registered as data indicating a new transmission/reception relationship between a device of the transmission origin (transmitting device) and a device of the transmission destination (receiving device).

Then, returning to FIG. 10, the data obtain unit 114 of the device [3] $100_3$ requests the device [2] $100_2$ (data transmission unit 115) to obtain shared data (Step S207). In this step, the data obtain unit 114 accesses the device [2] $100_2$ based on the device identification data (IP address) obtained upon receiving the notification of the data obtain target and obtains shared data from the data transmission unit 115.

In response to the request from the data obtain unit 114, the data transmission unit 115 of the device [2] $100_2$ transmits the shared data to the device [3] $100_3$ (data obtain unit 114) (Step S208).

Then, the data transmission unit 115 notifies completion of the transmission of the shared data to the device [1] $100_1$ (transmission completion receive unit 116) (Step S209). In this step, the data transmission unit 115 provides the device identification data (IP address) of the device [2] $100_2$ (transmitting device) and the device identification data (IP address) of the device [3] $100_3$ (receiving device).

In response to the notification from the data transmission unit 115, the transmission completion receive unit 116 registers the device [3] $100_3$ that has obtained the shared data (transmission completed device) to the transmission completion list 40D (Step S210). In this step, the transmission completion receive unit 116 refers to the participant list 20D based on the device identification data (IP address) obtained from the data transmission unit 115 and obtains the management identification data (ID value) of the device [2] $100_2$ (transmitting device) and the management identification data (IP value) of the device [3] $100_3$ (receiving device). Further, the transmission completion receive unit 116 registers new data indicating the management identification data (ID value) of the device [3] $100_3$ obtained from the data transmission unit 15 to the transmission completion list 40D. As a result, there is a transition of data in the transmission completion list 40D as illustrated in FIG. 11C. More specifically, the transition of data is described as follows.

First, the ID value 1' of the device [1] $100_1$ and the ID value 2' of the device [2] $100_2$ are already registered in the transmission completion list 40D. In this state, when Step S210 is executed, an ID value 3' of the device [3] $100_3$ is registered as data indicating a new transmission completed device.

Then, returning to FIG. 10, the transmission completion receive unit 116 updates the ongoing transmission list 30D in accordance with the status of the data sharing (transmission) between the device [2] $100_2$ and the device [3] $100_3$ (Step S211). In this step, the transmission completion receive unit 116 refers to the ongoing transmission list 30D based on the management identification data (ID value) of the device [2] $100_2$ (transmitting device) and the management identification data (ID value) obtained from the data transmission unit 115 and identifies a data set including corresponding (matching) management identification data. Then, the transmission completion receive unit 116 deletes the identified data set and updates the ongoing transmission list 30D. As a result, there is a transition of data in the ongoing transmission completion list 30D as illustrated in FIG. 11D. More specifically, the transition of data is described as follows.

First, the ID value 2' of the device [2] $100_2$ (transmitting device) and the ID value 2' of the device [2] $100_2$ (receiving device) which have performed transmission/reception of shared data are registered in the ongoing transmission list 30D. In this state, when Step S211 is executed, a corresponding data set that includes the ID value 2' of the device [2] $100_2$ (transmitting device) and the ID value 3' of the device [3] $100_3$ (receiving device) is deleted from the ongoing transmission list 30D, so that the values of the data items in the ongoing transmission list 30D becomes null. Thereby, the data indicating the transmission/reception relationship between the transmitting device and the receiving device is updated.

Figure 12:
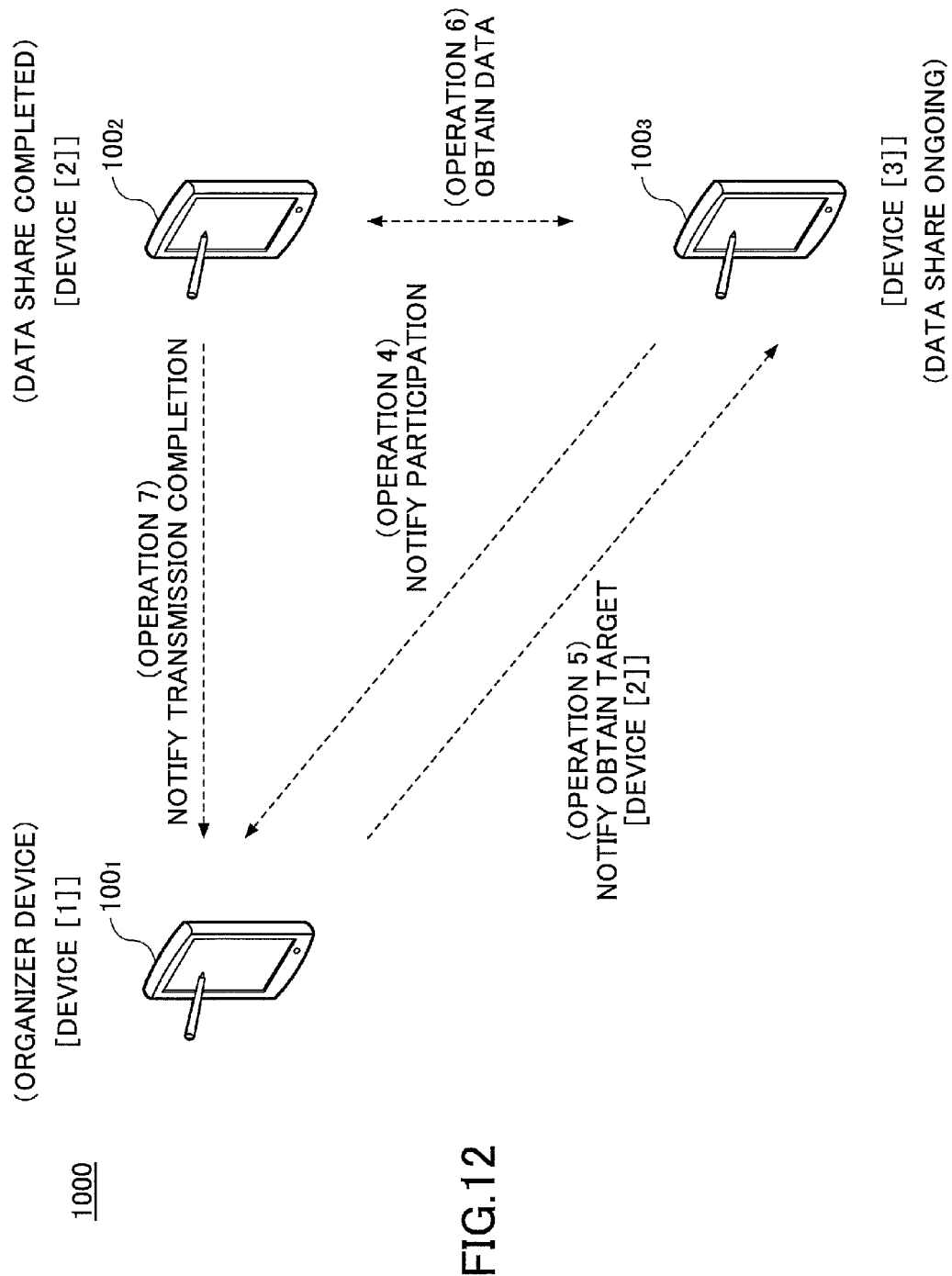
FIG. 12 is a schematic diagram illustrating operations performed in a data sharing operation (part 2) according to an embodiment of the present invention.

Hence, with the data share system 1000 according to the above-described embodiment, a data sharing process including operations (actions) illustrated in FIG. 12 can be performed by performing the data sharing process of FIG. 10 after performing the data sharing process of FIG. 7.

FIG. 12 is a schematic diagram illustrating actions performed in a data sharing operation (part 2) according to an embodiment of the present invention. First, when the device [1] $100_1$ waiting for a participation notification receives a participation notification from the device [3] $100_3$ (operation 4), the device [1] $100_1$ notifies to the device [3] $100_3$ that the device [2] $100_2$ (which has already obtained shared data) is the data obtain target from which the shared data is to be obtained (operation 5). Then, the device [3] $100_3$ becomes a state where data sharing (obtaining shared data) with respect to the device [2] $100_2$ is ongoing (operation 6). Then, after the transmission of the shared data to the device [3] $100_3$ is completed, the device [2] $100_2$ notifies to the device [1] $100_1$ that the transmission of the shared data is completed (operation 7).

Hence, with the data share function according to the above-described embodiment, data sharing processes with respect to multiple data process apparatuses are not performed entirely by the organizer device 100a. Instead, the workload of the processes can be distributed among one or more other data process apparatuses 100 including not only the organizer device 100a but also one or more participating devices 100b which have already obtained the shared data.

<<Process of Determining Data Obtain Target>>

FIG. 13 is a flowchart illustrating an example of a process of determining a data obtain target according to an embodiment of the present invention. In FIG. 13, the process of determining a data obtain target of Step S104 of FIG. 7 and Step S204 of FIG. 10 is illustrated in detail. In other words, processes performed by the data obtain target determining unit 1131 included in the data obtain target notification unit 113 of the organizer device 100a are illustrated in FIG. 13.

With reference to FIG. 13, the data obtain target determining unit 1131 identifies a participating device 100b which has already obtained shared data and is not currently transmitting any data (Step S302). In this step, the data obtain target determining unit 1131 accesses the ongoing transmission list storage unit 30 and the transmission completion list storage unit 40. The data obtain target determining unit 1131 refers to the transmission completion list 40D and obtains the management identification data (ID value) of one or more registered devices which has completed transmission of shared data. The data obtain target determining unit 1131 refers to the ongoing transmission list 30D and identifies the management identification data of a transmission completed device which does not match the management identification data of the transmitting device (transmission origin) registered in the ongoing transmission list 30D. As a result, the data obtain target determining unit 1131 identifies one or more participating devices 100b that correspond to the identified management identification data. The one or more participating devices 100b identified by the data obtain target determining unit 1131 are participating devices 100b which have obtained shared data and are not currently transmitting shared data.

Then, the data obtain target determining unit 1131 determines whether any participating devices 100b have been identified (whether there are any identified data) (Step S302).

In a case where no participating device 100b is identified (no identified data) (No in Step S302), the data obtain target determining unit 1131 determines that the organizer device 100a is the data obtain target (Step S303). Accordingly, the data obtain target determining unit 1131 transmits the device identification data (IP address) of the organizer device 100a to the participation requesting device 100c.

On the other hand, in a case where one or more participating devices is identified (existence of identified data) (Yes in Step S302), the data obtain target determining unit 1131 determines whether multiples participating devices 100b are identified (multiple corresponding data) (Step S304).

In a case where the data obtain target determining unit 1131 determines that one participating device 100b is identified (No in Step S304), the data obtain target determining unit 1131 determines the identified participating device 100b as the data obtain target (Step S305). Thereby, the data obtain target notification unit 113 transmits the device identification data (IP address) of the determined participating device 100b to the participation requesting device 100c. In order to transmit the device identification data, the data obtain target notification unit 113 accesses the participant list storage unit 20. Then, the data obtain target notification unit 113 refers to the participant list 20D and obtains the device identification data (IP address) associated to the management identification data (corresponding data) obtained from the results of performing the above-described process of searching management identification data. Thereby, the data obtain target notification unit 113 obtains the device identification data of the participating device 100b determined as the data obtain target.

On the other hand, in a case where multiple participating devices 100b are identified (plural corresponding data identified) (Yes in Step S304), the data obtain target notification unit 113 determines one participating device 100b as the data obtain target from the multiple identified participating devices 100b (Step S306). The one participating device 100b determined as the data obtain target is a device participating earliest in the event among the multiple participating devices 100b. In this step, the data obtain target determining unit 1131 determines the order of participation in the event based on the management identification data (corresponding data) obtained from the results of performing the above-described process of searching management identification data. For example, in a case where the management identification data (ID value) is issued in accordance with the order of participation in the event (order in which the participation notification is received), the data obtain target determining unit 1131 compares the ID values obtained from the results of performing the above-described process of searching management identification data and determines the participating device 100b to be the data obtain target from the multiple participating devices 100b based on the comparison results. For example, the participating device 100b having the lowest ID value is determined as the data obtain target. The participating device 100b having the lowest ID value may be, for example, a participating device 100b having the least amount of workload for transmitting data to the participation requesting device 100a.

Hence, with the process of determining the data obtain target according to the above-described embodiment, the participating device 100b which has obtained shared data (storing shared data therein), is not currently transmitting shared data to other data process apparatuses 100, and having the least amount of workload for transmitting data to the participation requesting device 100c.

<<Example of Operations of a Data Sharing Process>>

With the data share system 1000 according to the above-described embodiment, a data sharing operation performed in various instances of receiving a participation notification from a new participation requesting device is described below.

Figure 14A:
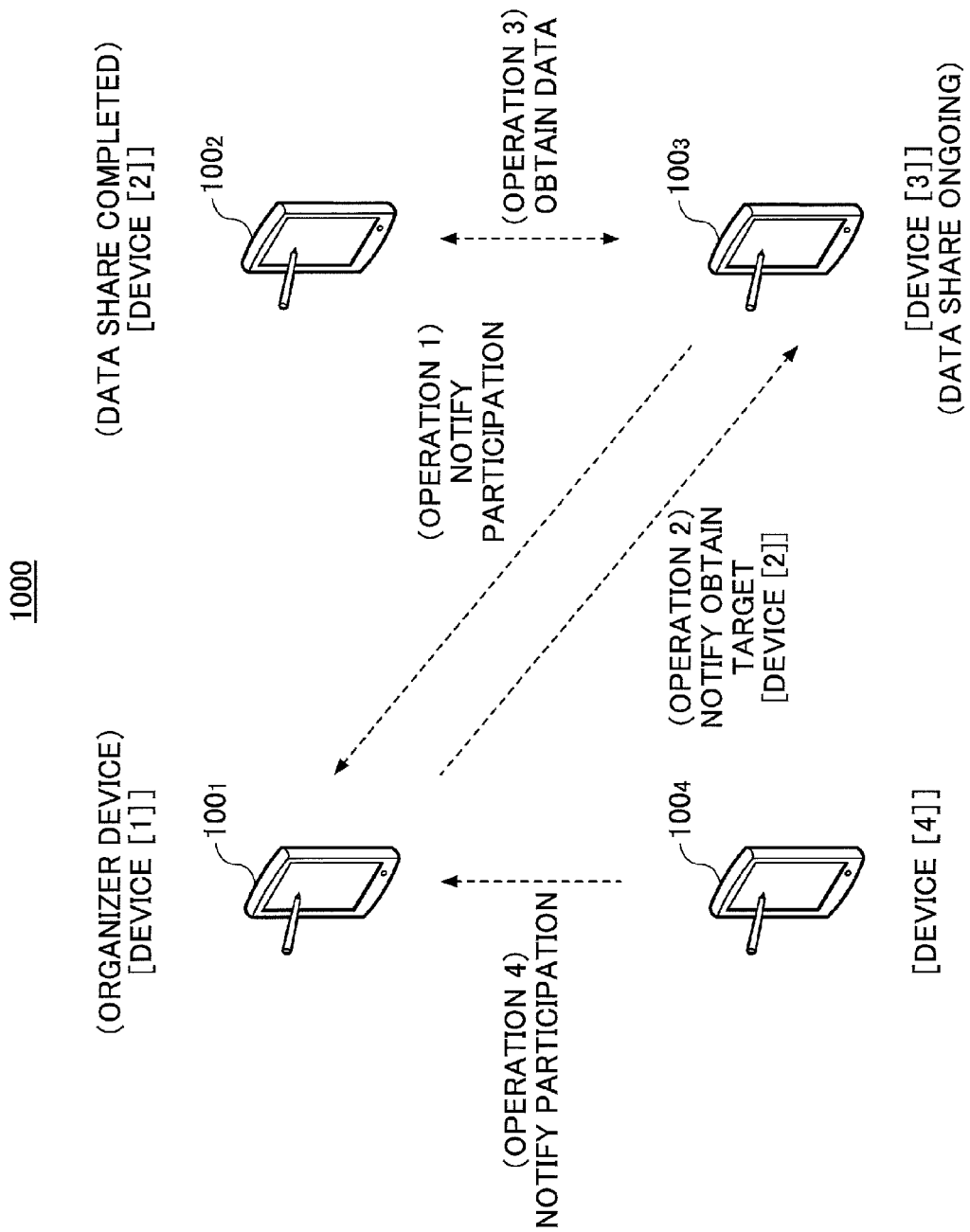
FIGS. 14A and 14B are schematic diagrams illustrating operations performed in a data sharing operation (part 3) according to an embodiment of the present invention.
Figure 14B:
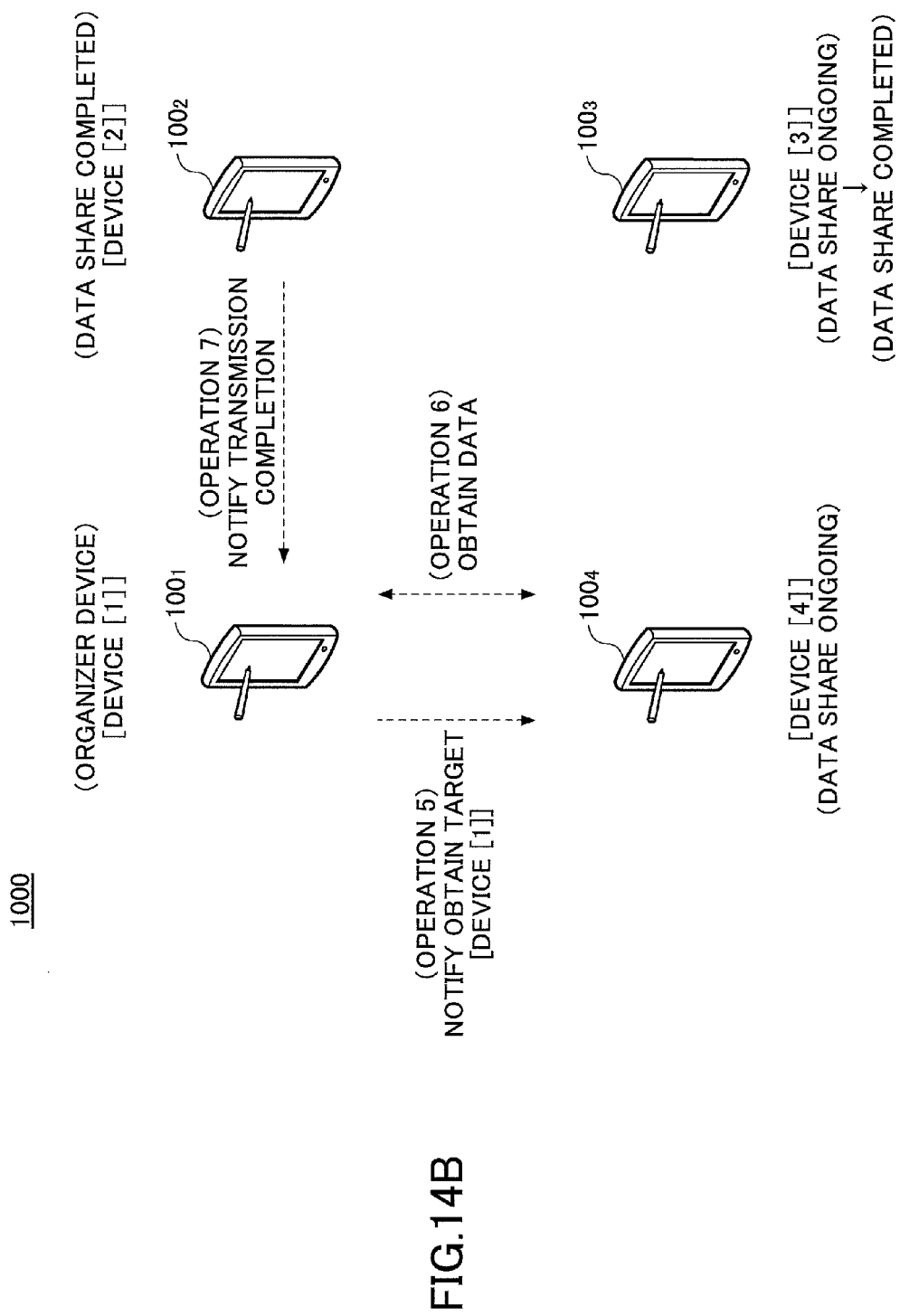

FIGS. 14A and 14B are schematic diagrams illustrating operations performed in a data sharing operation (part 3) according to an embodiment of the present invention. FIGS. 14A and 14B illustrate a case of connecting a new device [4] $100_4$ as a new participation requesting device 100c to the data share system 1000 having the device [1] $100_1$ (organizer device 100a) and the device [2] $100_2$ (participating device 100b) connected each other in a state where data sharing is ongoing between the device [2] $100_2$ and the device [3] $100_3$ (shared data being currently transmitted from the device [2] $100_2$ to the device [3] $100_3$).

As illustrated in FIG. 14A, the device [1] $100_1$ waiting for a participation notification receives a participation notification from the device [3] $100_3$ (operation 1). Because the device [2] $100_2$ has already obtained shared data, the device [1] $100_1$ determines the device [2] $100_2$ as the data obtain target. Then, the device [1] $100_1$ notifies to the device [3] $100_3$ that the device [2] $100_2$ is the data obtain target from which shared data is to be obtained (operation 2). Thereby, the device [2] $100_2$ becomes a state where data sharing (obtaining shared data) with respect to the device [1] $100_1$ is ongoing (operation 3). In this state, the device [1] $100_1$ waiting for a participation notification receives a participation notification from the device [4] $100_4$ (operation 4).

As illustrated in FIG. 14B, when the device [1] $100_1$ receives the participation notification from the device [4] $100_4$, the device [1] $100_1$ determines the device [1] $100_1$ itself as the data obtain target because transmission of shared data from the device [2] $100_2$ to the device [3] $100_3$ is ongoing (operation 5). Thereby, the device [4] $100_4$ becomes a state where data sharing (obtaining shared data) with respect to the device [1] $100_1$ is ongoing (operation 5). In this state, the device [1] $100_1$ waiting for a participation notification receives a participation notification from the device [4] $100_4$ (operation 4). Then, after the device [2] $100_2$ completes transmitting shared data to the device [3] $100_3$, the device [2] $100_2$ notifies to the device [1] $100_1$ that the transmission of shared data is completed (operation 7). In this state, the device [3] $100_3$ has obtained shared data.

Figure 15A:
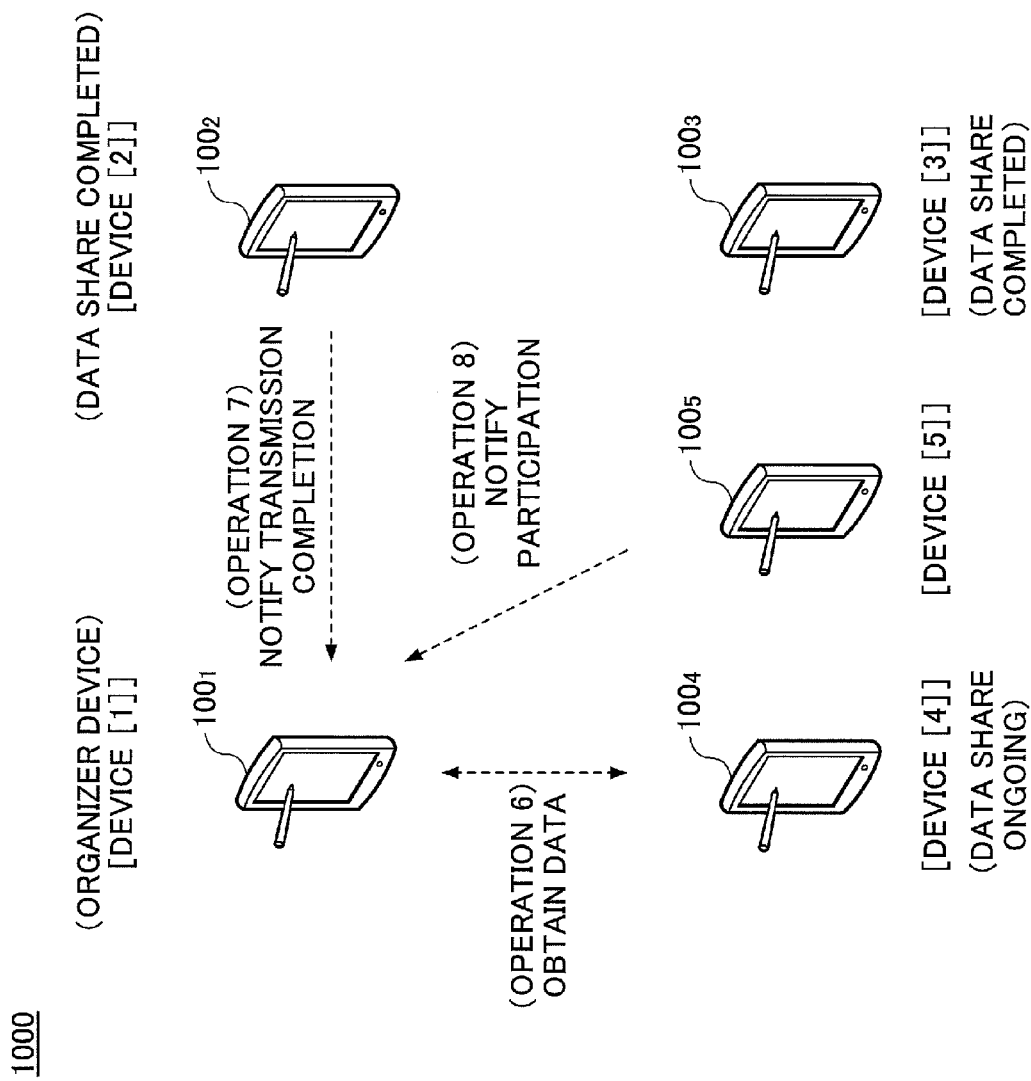
FIGS. 15A-15B are schematic diagrams illustrating operations performed in a data sharing operation (part 4) according to an embodiment of the present invention.
Figure 15B:
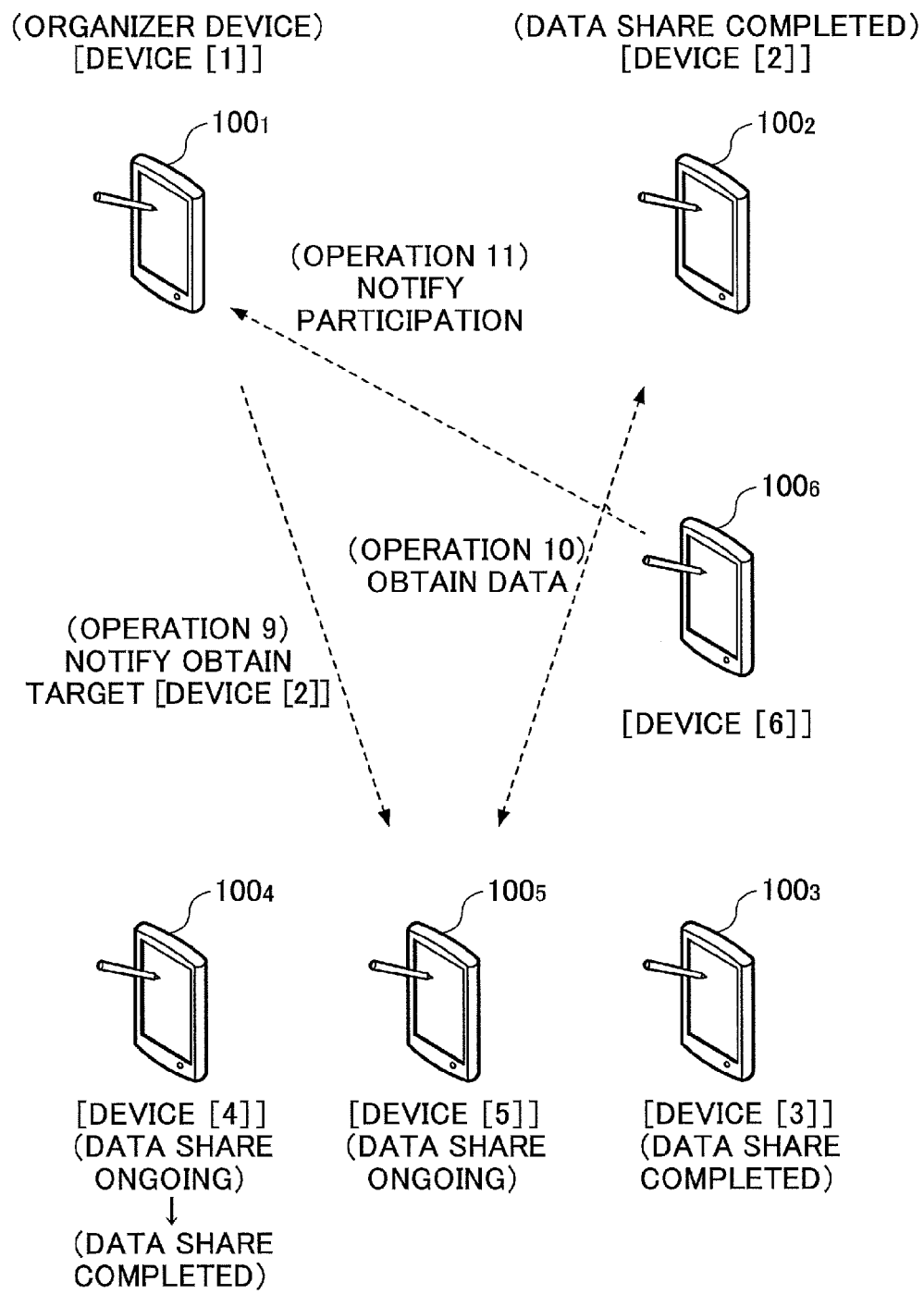
Figure 16A:
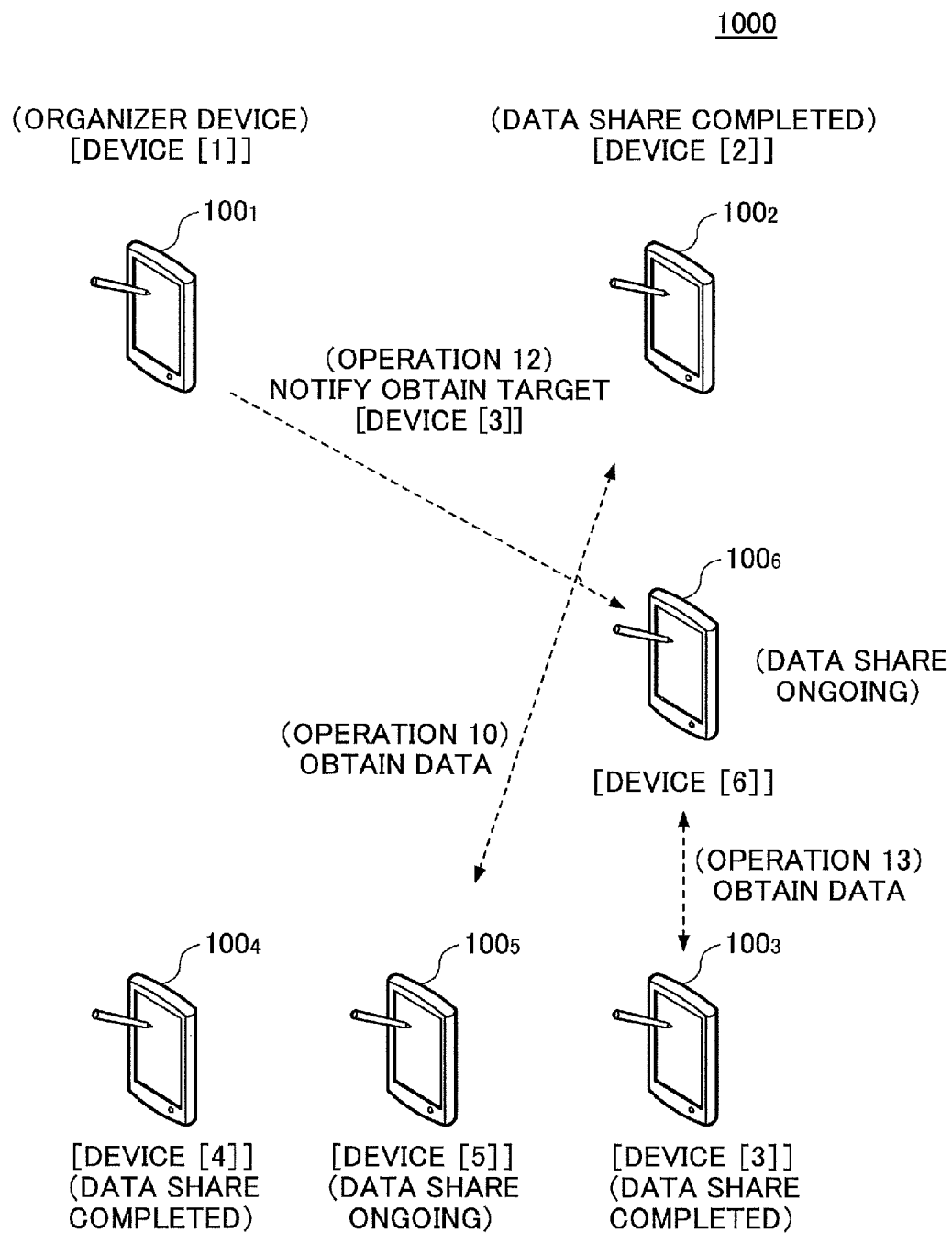
FIGS. 16A-16B are schematic diagrams illustrating operations performed in a data sharing operation (part 5) according to an embodiment of the present invention.
Figure 16B:
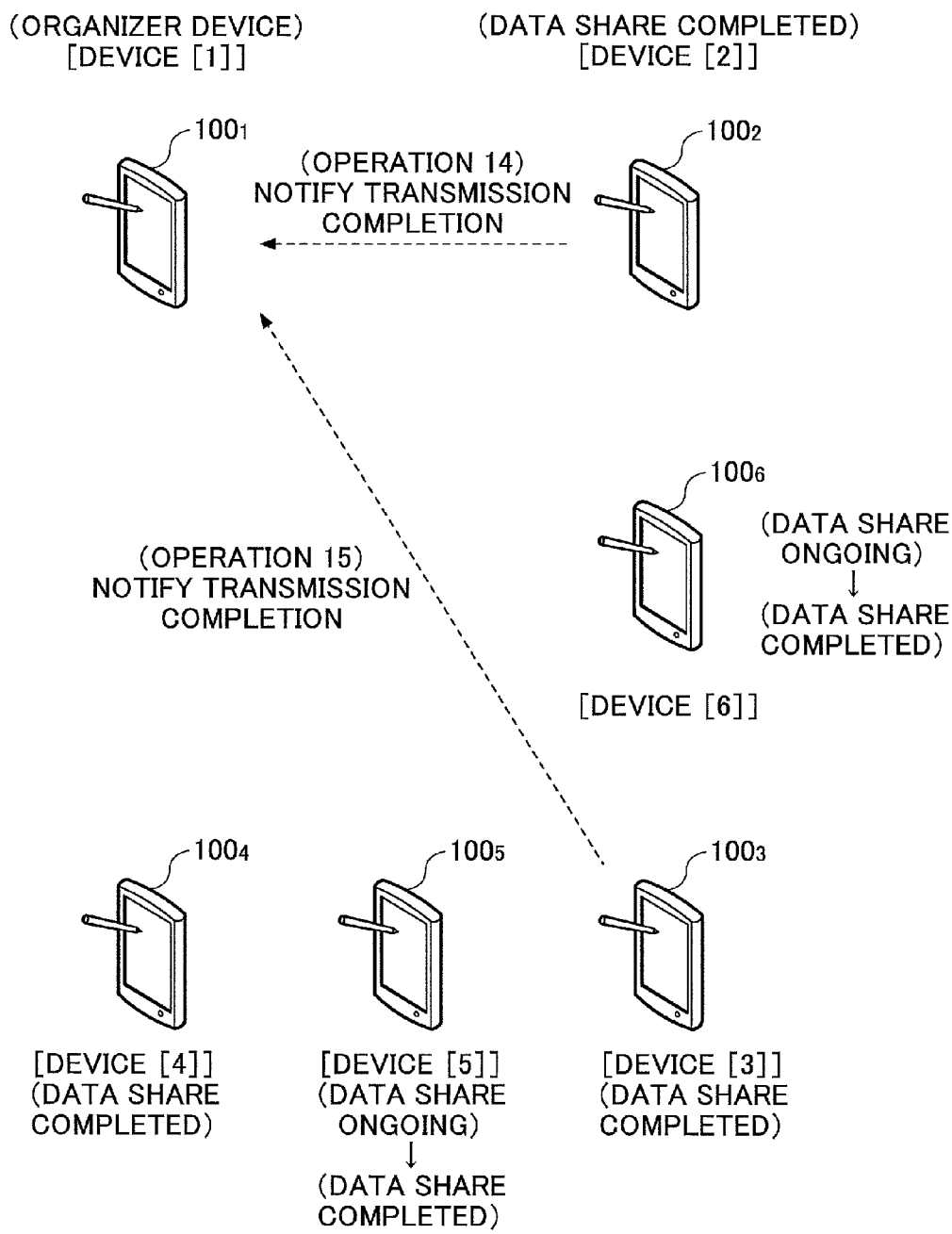

FIGS. 15A and 15B are schematic diagrams illustrating operations (actions) performed in a data sharing process (part 4) according to an embodiment of the present invention. FIGS. 16A and 16B are schematic diagrams illustrating operations performed in a data sharing operation (part 5) according to an embodiment of the present invention.

FIGS. 15A-16B illustrate a case of connecting new devices [5] $100_5$, [6] $100_6$ as new participation requesting devices 100c to the data share system 1000 having the device [2] $100_2$ and the device [3] $100_3$ (participating devices 100b) connected to the device [1] $100_1$ (organizer device 100a) in a state where data sharing is ongoing between the device [1] $100_1$ and the device [2] $100_2$ (shared data being currently transmitted from the device [1] $100_1$ to the device [2] $100_2$).

As illustrated in FIG. 15A, the device [2] $100_2$ notifies to the device [1] $100_1$ that the transmission of shared data is completed (operation 7). Then, the device [1] $100_1$ waiting for a participation notification receives a participation notification from the device [5] $100_5$ (operation 8).

As illustrated in FIG. 15B, in a case where the device [1] $100_1$ receives a participation notification from the device [6] $100_6$, the device [1] $100_1$ determines the device [2] $100_2$ as the data obtain target because the device [2] $100_2$ is the one having an earlier participation order among the devices [2] $100_2$ and [3] $100_3$ (both of which having obtained shared data and not currently transmitting shared data). Accordingly, the device [1] $100_1$ notifies to the device [5] $100_5$ that the device [2] $100_2$ is the data obtain target (operation 9). Thereby, the device [5] $100_5$ becomes a state where data sharing (obtaining shared data) with respect to the device [2] $100_2$ is ongoing (operation 10). It is to be noted that, after the device [4] $100_4$ completes data sharing with the device [1] $100_1$, the device [4] $100_4$ becomes a state where shared data is obtained. In this state, the device [1] $100_1$ waiting for a participation notification receives a participation notification from the device [6] $100_6$ (operation 11).

As illustrated in FIGS. 15B and 16A, in a case where the device [1] $100_1$ receives a participation notification from the device [6] $100_6$, the device [1] $100_1$ determines the device [3] $100_3$ as the data obtain target because the device [3] $100_3$ is the one having an earlier participation order among the devices [3] $100_3$ and [4] $100_4$ (both of which having obtained shared data and not currently transmitting shared data). Accordingly, the device [1] $100_1$ notifies to the device [6] $100_6$ that the device [3] $100_3$ is the data obtain target (operation 12). Thereby, the device [6] $100_6$ becomes a state where data sharing (obtaining shared data) with respect to the device [3] $100_3$ is ongoing (operation 13).

As illustrated in FIG. 16B, after the device [2] $100_2$ completes transmitting shared data to the device [5] $100_5$, the device [2] $100_2$ notifies to the device [1] $100_1$ that transmission of shared data is completed (operation 14). Thereby, the device [5] $100_5$ becomes a state where shared data is obtained. Further, after the device [3] $100_3$ completes transmitting shared data to the device [6] $100_6$, the device [3] $100_3$ notifies to the device [1] $100_1$ that transmission of shared data is completed (operation 15). Thereby, the device [6] $100_6$ becomes a state where shared data is obtained.

With the data process apparatus 100 according to the above-described embodiment, in a case where the data process apparatus 100 is the organizer device 100a, the participation receive unit 112 of the organizer device 100a receives a notification requesting participation to an event (participation notification) from the participation requesting device 100b. Then, the data obtain target notification unit 113 of the device [1] $100_1$ notifies to the participation requesting device 100c that the participating device 100b (from which a participation notification is already received) is the data obtain target. In notifying the data obtain target, the obtain target determining unit 1131 of the data obtain target notification unit 113 determines the data obtain target (device from which the participation requesting device 100c is to obtain shared data) from one or more participating devices 100b based on, for example, the data share status and the data transmission status of the one or more participating devices 100b. As a result, the participation requesting device 100c obtains shared data from the device notified by the device [1] $100_1$.

Accordingly, with the data share system 1000 according to the above-described embodiment, the workload for obtaining shared data can be distributed among multiple data process apparatuses 100. As a result, data sharing can be efficiently performed with reduced workload.

Modified Example 1

Next, a modified example 1 (first modified example) of the present invention is described.

Figure 17A:
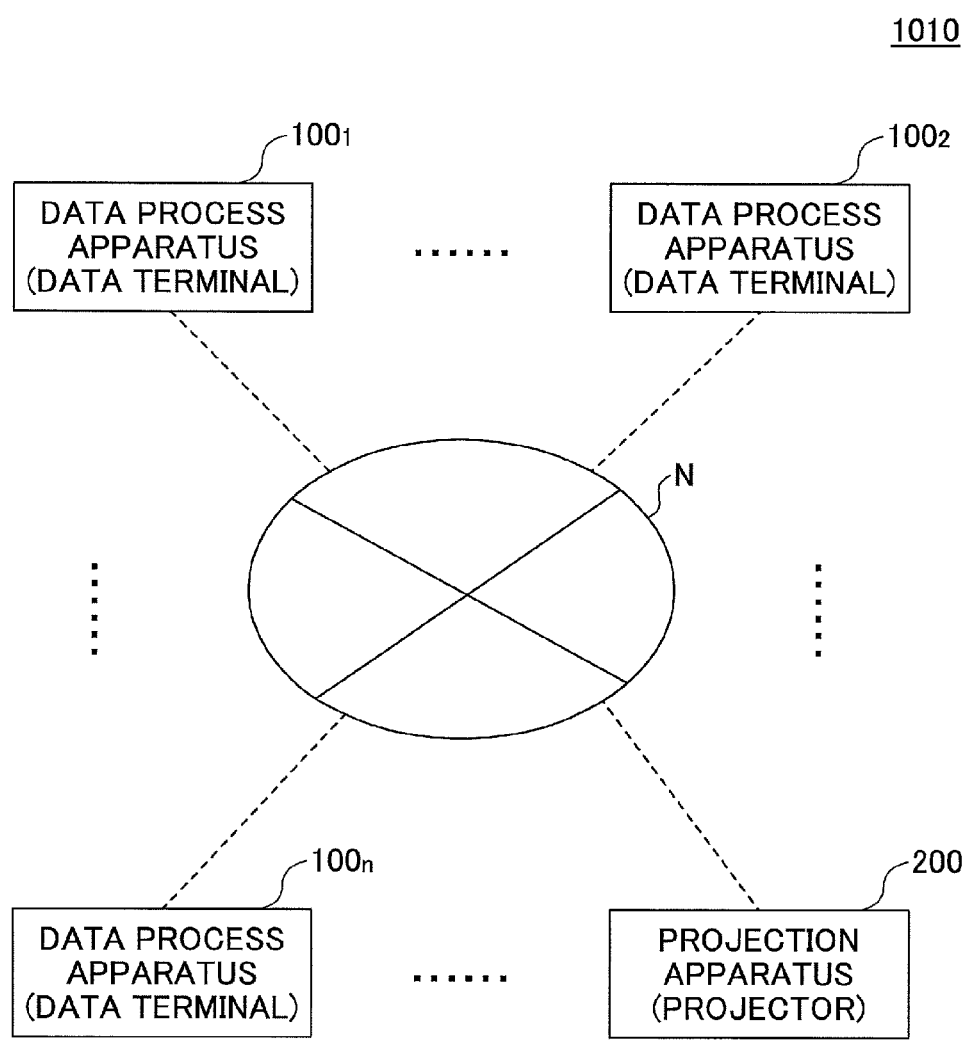
FIGS. 17A and 17B are schematic diagrams illustrating a data share system according to a first modified example.
Figure 17B:
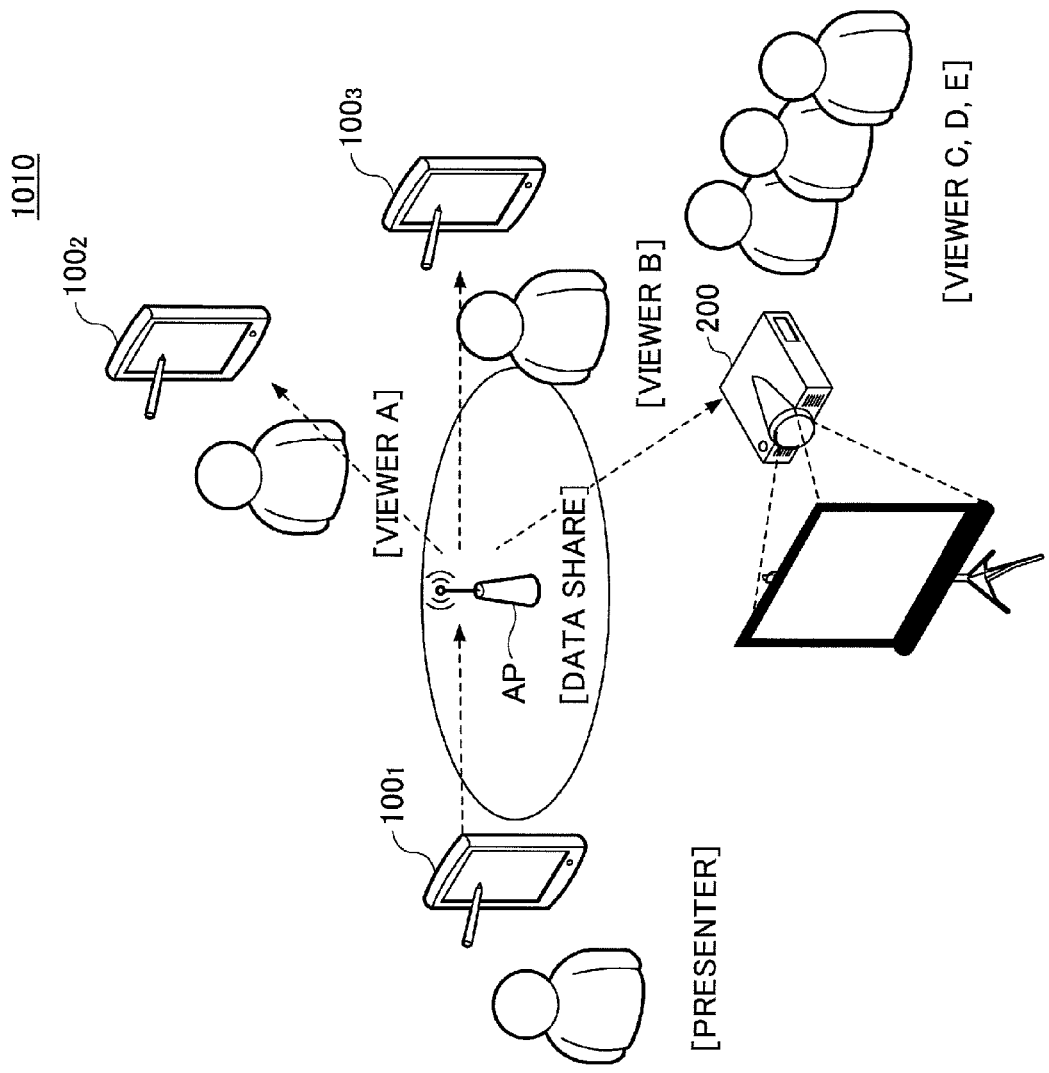

FIGS. 17A and 17B are schematic diagrams illustrating a data share system 1010 according to the first modified example. The difference between the configuration of the data share system 1010 of FIG. 17A and the configuration of the data share system 1000 of FIG. 1A is that a projection apparatus (projector) 200 is connected to the data transmission path N.

The projection apparatus 200 is a device including a wireless communication function and a data display function (e.g., projector).

FIG. 17B illustrates a case where the data share system 1010 of the first modified example is used for a conference presentation. In this case, display contents, which are based on shared data, are not only displayed on the data process apparatuses $100_2$, $100_3$ of the viewers but are also projected to a screen by the projection apparatus 200.

Similar to the above-described data process apparatus 100, the projection apparatus 200 includes hardware that enable a screen to be shared among multiple data process apparatuses 100.

Figure 18:
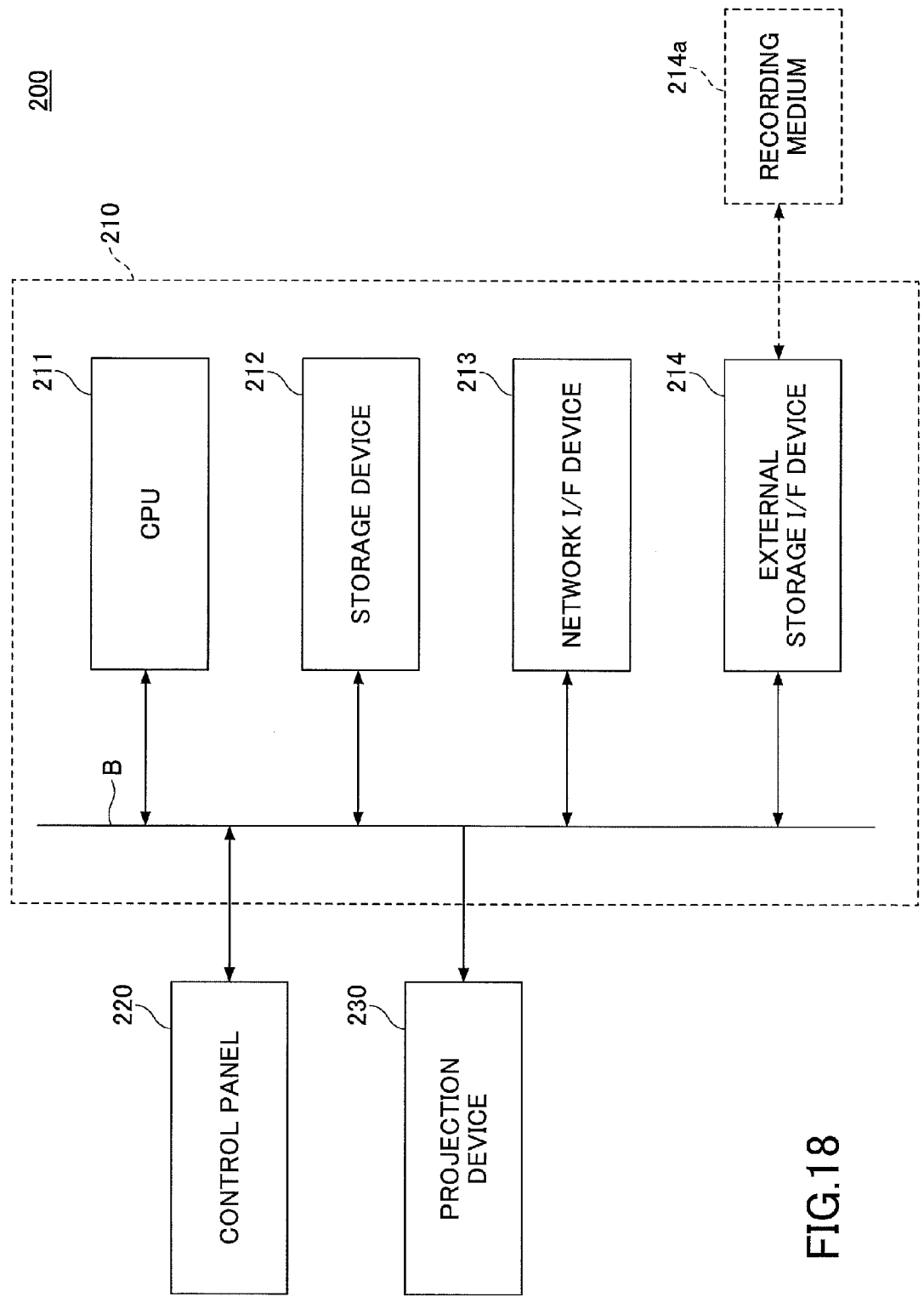
FIG. 18 is a schematic diagram illustrating an example of a hardware configuration of a projection apparatus according to a first modified example.

FIG. 18 is a schematic diagram illustrating an example of a hardware configuration of the projection apparatus 200 according to the first modified example. As illustrated in FIG. 18, the projection apparatus 200 includes, for example, a controller 210, a control panel 220, and a projection device 230 that are connected to each other by a bus B.

The control panel 220 includes, for example, an input unit and a display unit. The control panel 220 is for providing various data (e.g., device data) to the user and receiving various maneuvers by the user in order to, for example, input settings or input instructions to the projection apparatus 200. The projection device 230 is for projecting image data onto a screen.

The controller 210 includes a control board having, for example, a CPU 211, a storage device 212, a network I/F 213, and an external storage I/F 214 that are connected to each other by the bus B.

The storage device 211 includes, for example, a RAM, a ROM, a HDD which retain and store various programs and data therein. The CPU 106 includes, for example, a processor that controls the entire data process apparatus 100 and executes functions of the data process apparatus 100 by obtaining data and programs from, for example, the HDD 108 or the ROM 105 and loading the data and programs to the RAM (memory) 104, and executing various processes. The CPU 212 includes a processor that controls the entire projection apparatus 200 and executes functions of the projection apparatus 200 by obtaining data and programs from, for example, the HDD or the ROM and loading the data and programs to the RAM (memory), and executing various processes.

The network I/F 213 is an interface that connects the projection apparatus 200 to the data transmission path N. Thereby, the projection apparatus 200 can perform data communications with the one or more data process apparatuses 100 by way of the network I/F 213.

The external I/F 214 is an interface that connects the projection apparatus 200 to an external storage device such as a computer-readable recording medium 214a. The computer-readable recording medium 214a includes, for example, an SD (Secure Digital) memory card or a USB (Universal Serial Bus) memory. Accordingly, the projection apparatus 200 reads data from the computer-readable recording medium 214a and/or writes data to the computer-readable recording medium 214a by way of the external I/F 214.

Accordingly, with the projection apparatus 200 according to the first modified example having the above-described hardware configuration, a data share program (software having a data share function), which is installed in the projection apparatus 200 constituting the data share system 1010, is executed by loading the data share program from the storage device 212 to the memory (e.g., RAM) of the projection apparatus 100 and executed by the processor (e.g., CPU 211) of the projection apparatus 200.

Hence, substantially the same effects (advantages) as those of the data share system 1010 can be attained with the data share system 1010 according to the first modified example.

Modified Example 2

Next, a modified example 2 (second modified example) of the present invention is described.

Figure 19A:
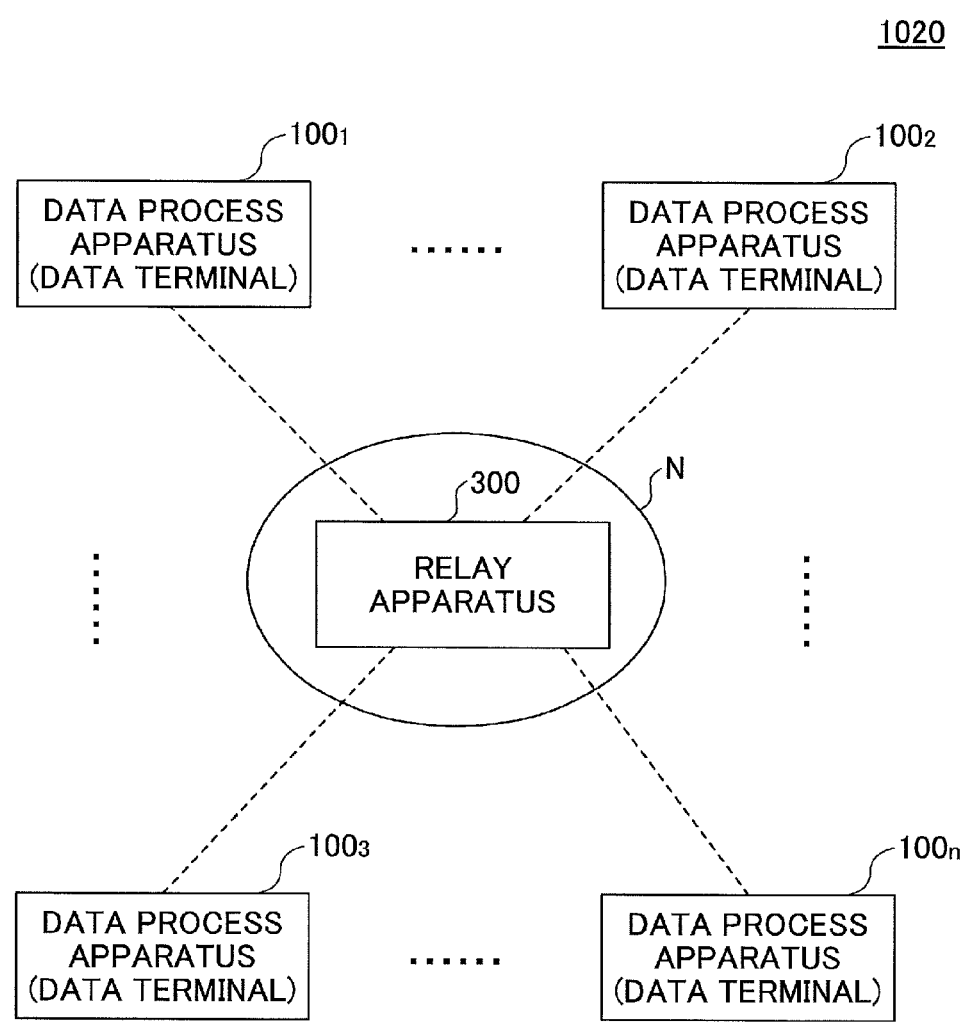
FIGS. 19A and 19B are schematic diagrams illustrating a data share system according to a second modified example.
Figure 19B:
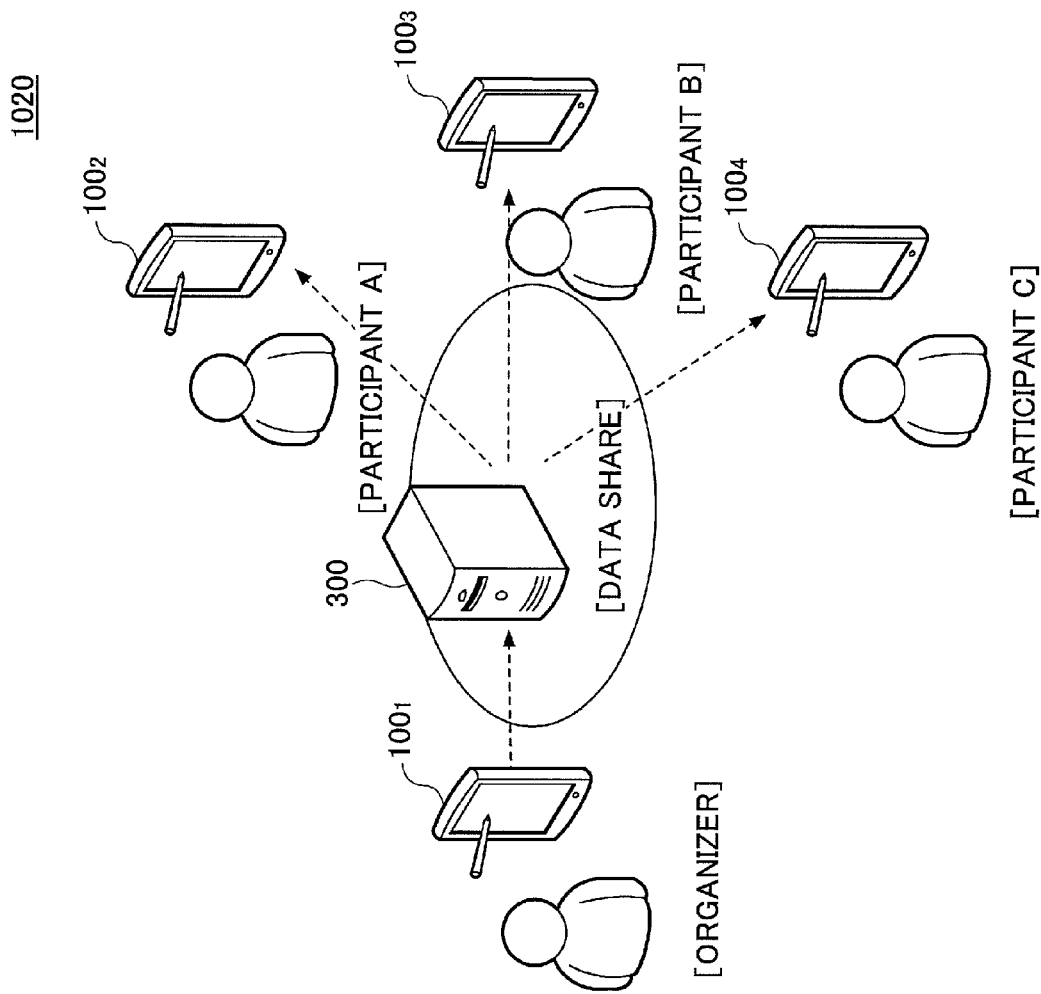

FIGS. 19A and 19B are schematic diagrams illustrating a data share system 1020 according to the second modified example. The difference between the configuration of the data share system 1020 of FIG. 19A and the configuration of the data share system 1000 of FIG. 1A is that a relay apparatus 300 is connected to the data transmission path N as an alternate device of an access point AP.

FIG. 19B illustrates a case where the data share system 1020 of the second modified example is used for a conference. In this case, the process of transmitting shared data among the data process apparatuses 100 is performed by using the relay apparatus 300 instead of using the access apparatus AP as described above with FIG. 1B.

Hence, substantially the same effects (advantages) as those of the data share system 1010 can be attained with the data share system 1020 according to the first modified example. It is to be noted that wireless communication, wired communication, or both may be used in the communication environment of the data share system 1020. Thus, communications may be performed in accordance with the type of communication unit included in the relay apparatus 300.

Modified Example 3

Next, a modified example 3 (third modified example) of the present invention is described.

Figure 20:
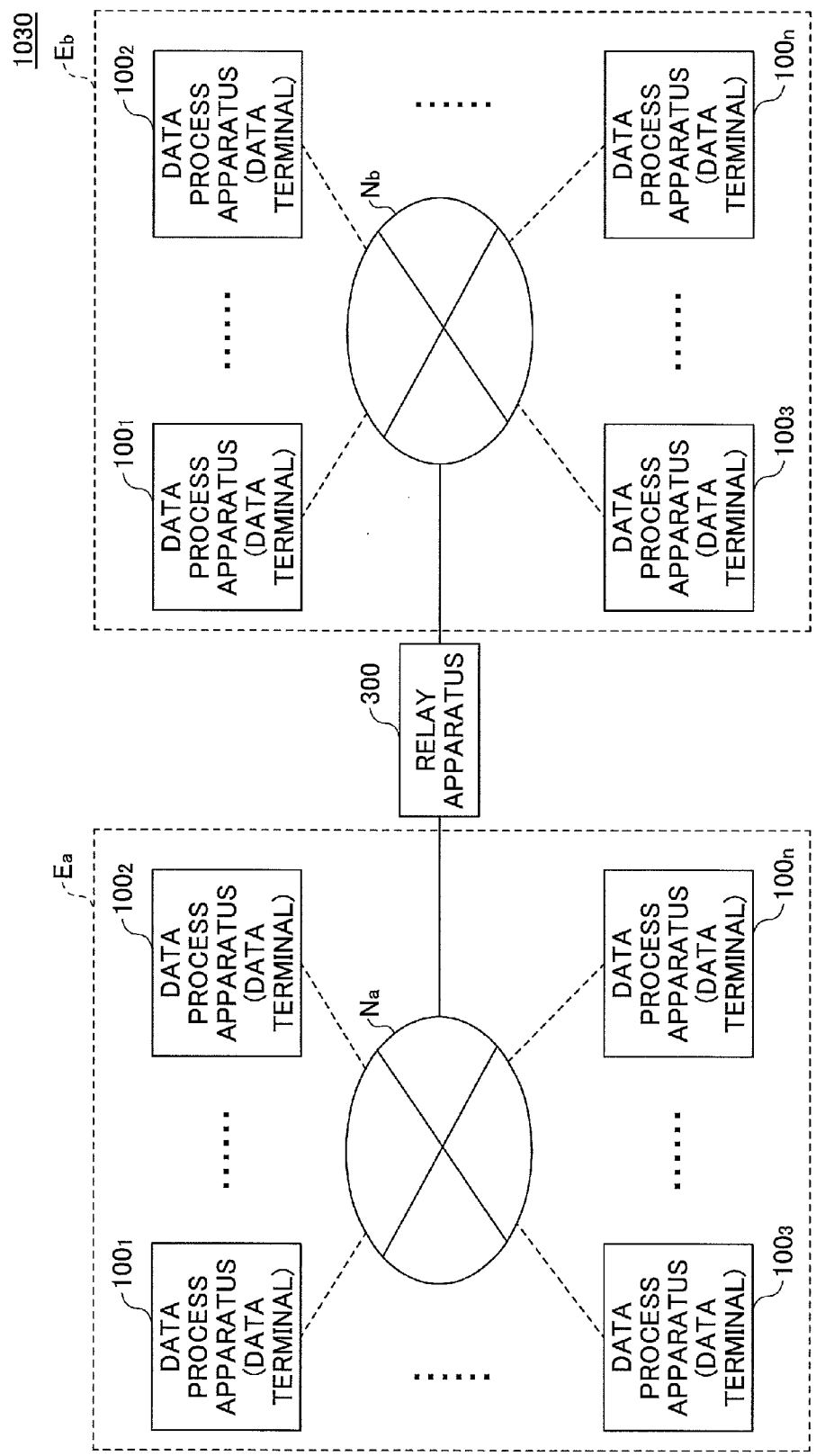
FIG. 20 is a schematic diagram illustrating a data share system according to a third modified example.

FIG. 20 is a schematic diagram illustrating a data share system 1030 according to the third modified example. The difference between the configuration of the data share system 1030 of FIG. 20 and the configuration of the data share system 1000 of FIG. 1A is that different network areas Ea, Eb are connected to each other via a relay apparatus 300. That is, in the third modified example, the relay apparatus 300 relays (routing) data communications between the network area Ea and the network area Eb. It is to be noted that the term "different network areas" may be networks having a different segment(s).

Figure 21:
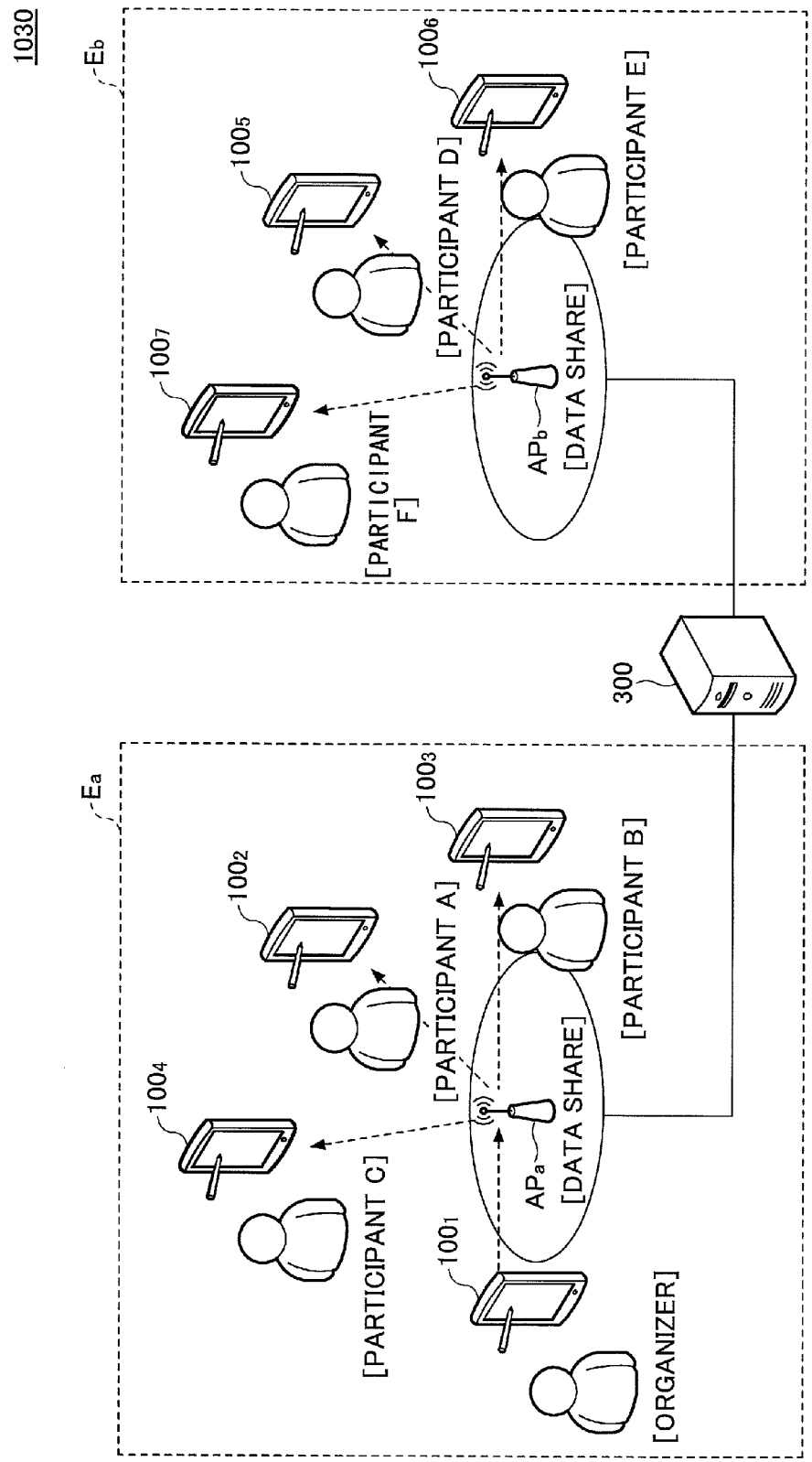
FIG. 21 is a schematic diagram illustrating a case where a data share system of a third modified example is used for a conference.

FIG. 21 illustrates a case where the data share system 1030 of the third modified example is used for a conference. In this case, the process of transmitting shared data among the data process apparatuses 100 is performed as follows. It is to be noted that, in the third modified example, the document data shared by data process apparatuses $100_1$-$100_4$ in the conference is retained (stored) in the data process apparatus $100_1$ connected to the network area Ea. Thus, in the third modified example, the document data of the conference is shared between an office A at which the network area Ea is built and an office B at which the network area Eb is built.

First, the data process apparatus $100_1$ of the organizer of the conference detects an access point APa located in a conference room of the office A and connects to the network area Ea. Thereby, the data process apparatus $100_1$ waits for other data process apparatuses $100_2$-$100_n$ to transmit a participation notification to the data process apparatus $100_1$.

In this state, the data process apparatus $100_2$ of a participant A detects the same access point APa and connects to the network area Ea. Thereby, the data process apparatus $100_2$ notifies participation to the conference to the data process apparatus $100_1$. Thereby, the data process apparatus $100_1$ notifies the device data of the data process apparatus $100_1$ itself to the data process apparatus $100_2$. Then, the data process apparatus $100_2$ obtains document data of the conference from the data process apparatus $100_1$ based on the device data notified to the data process apparatus $100_2$. Thereby, document data can be shared.

Then, the data process apparatus $100_3$ of a participant B detects the same access point APa and connects to the network area Ea. Thereby, the data process apparatus $100_3$ notifies participation to the conference to the data process apparatus $100_1$. Thereby, the data process apparatus $100_1$ notifies the device data of the data process apparatus $100_2$ which has obtained shared data to the data process apparatus $100_3$. Then, the data process apparatus $100_3$ obtains document data of the conference from the data process apparatus $100_2$ based on the device data notified to the data process apparatus $100_3$. Thereby, document data can be shared.

Then, the data process apparatus $100_4$ of a participant C detects the same access point APa and connects to the network area Ea. Thereby, the data process apparatus $100_4$ notifies participation to the conference to the data process apparatus $100_1$. Thereby, the data process apparatus $100_1$ notifies the device data of the data process apparatus $100_3$ which has obtained shared data to the data process apparatus $100_4$. Then, the data process apparatus $100_4$ obtains document data of the conference from the data process apparatus $100_3$ based on the device data notified to the data process apparatus $100_4$. Thereby, document data can be shared.

Further, in a case where there is a new participant in the office B, the data share system 1030 is used as follows.

The data process apparatus $100_5$ of a participant D detects an access point APb located in a conference room of the office B and connects to the network area Eb. Thereby, the data process apparatus $100_5$ notifies participation to the conference to the data process apparatus $100_1$ by way of the relay apparatus 300. Thereby, the data process apparatus $100_1$ notifies the device data of the data process apparatus $100_1$ itself to the data process apparatus $100_5$ by way of the relay apparatus 300. Then, the data process apparatus $100_5$ obtains document data of the conference from the data process apparatus $100_1$ based on the device data notified to the data process apparatus $100_5$. Thereby, document data can be shared.

Then, the data process apparatus $100_6$ of a participant E detects the same access point APb and connects to the network area Eb. Thereby, the data process apparatus $100_6$ notifies participation to the conference to the data process apparatus $100_1$ by way of the relay apparatus 300. Thereby, the data process apparatus $100_1$ notifies the device data of the data process apparatus $100_5$ which has obtained shared data to the data process apparatus $100_6$ by way of the relay apparatus 300. Then, the data process apparatus $100_6$ obtains document data of the conference from the data process apparatus $100_5$ based on the device data notified to the data process apparatus $100_6$ by way of the relay apparatus 300. Thereby, document data can be shared.

Then, the data process apparatus $100_7$ of a participant F detects the same access point APb and connects to the network area Eb. Thereby, the data process apparatus $100_7$ notifies participation to the conference to the data process apparatus $100_1$ by way of the relay apparatus 300. Thereby, the data process apparatus $100_1$ notifies the device data of the data process apparatus $100_6$ which has obtained shared data to the data process apparatus $100_7$ by way of the relay apparatus 300. Then, the data process apparatus $100_7$ obtains document data of the conference from the data process apparatus $100_6$ based on the device data notified to the data process apparatus $100_7$ by way of the relay apparatus 300. Thereby, document data can be shared.

With the above-described configuration of the data share system 1030 of the third modified example, a distribution type data share service among multiple data process apparatuses 100 can be provided even between different network areas Ea, Eb. Accordingly, in a case where the relay apparatus 300 has a routing function (relay function) for relaying data communications between an external network (public area) and an internal network (private area), the data share service can be provided in a wide area.

The data share function of the above-described embodiments can be performed by causing a processor (e.g., CPU 106, 211) of the devices constituting the data share system 1000, 1020, 1030 (e.g., data process apparatus 100, projection apparatus 200) to execute the steps illustrated above in, for example, FIGS. 7, 10, and 13 in accordance with a program encoded with a programming language of a suitable operating environment (platform).

For example, in a case of the data process apparatus 100, the program may be recorded in the computer-readable recording medium 103a. Thereby, the program can be installed in the data process apparatus 100 via the drive device 103. Further, because the interface device 107 is included in the data process apparatus 100, the program may be downloaded from a telecommunication line and installed in the data process apparatus 100.

In the above-described embodiments, although the data process apparatuses 100 are managed based on the management identification data which are registered in the lists 20D, 30D, 40D and issued upon reception of the participation notification, the data process apparatuses 100 may be managed based on device identification data (e.g., IP address). In such case where the data process apparatuses 100 are managed based on device identification data, only the device identification data is registered in the lists 20D, 30D, 40D. In this case, the above-described participation order of the data process apparatuses 100 is determined based on, for example, the order in which device identification data of the data process apparatus are registered in the participant list 20D (listed order).

The present invention is not limited to the specifically disclosed embodiments, and variations and modifications may be made without departing from the scope of the present invention.

What is claimed is:

1. A data process apparatus for sharing shared data among a plurality of data process apparatuses participating in an event, the data process apparatus comprising:
 a processor, in communication with a memory, configured to execute the steps of
  retrieving a first information indicating one or more of the plurality of devices that has completed transmission of the shared data and a second information indicating one or more of the plurality of devices that is currently transmitting the shared data,
  identifying at least one of the plurality of devices that is not currently transmitting the shared data based on the first and second information, further identifying a device participating earliest in the event from among the identified at least one of the plurality of devices, and
  determining the identified one of the plurality of devices as a data obtain target from which the shared data is to be obtained based on a participation order of the event, in a case where one of the plurality of devices has already obtained the shared data and is not transmitting the shared data, the participation order of the event being an order in which the plurality of devices participate in the event.

2. The data process apparatus recited in claim 1, wherein the processor is further configured to receive a participation notification from each of the plurality of devices including first and second devices participating in the event.

3. The data process apparatus recited in claim 2, wherein the processor is further configured to execute a step of notifying the first device from which the participation notification has already been received to the second device as the data obtain target.

4. The data process apparatus recited in claim 1, wherein the plurality of devices include first and second devices participating in the event, wherein the processor is further configured to execute a step of determining the second device as the data obtain target based on a data share status of the second device and a data transmission status of the second device, wherein the determined second device is notified as the data obtain target to the first device.

5. The data process apparatus as claimed in claim 1, wherein the processor is further configured to execute the step of identifying as the data obtain target that is not currently transmitting the shared data.

6. A data process method for sharing shared data among a plurality of devices participating in an event via a network, the data process comprising the steps of:
 retrieving a first information indicating one or more of the plurality of devices that has completed transmission of the shared data and a second information indicating one or more of the plurality of devices that is currently transmitting the shared data;
 further identifying a device participating earliest in the event from among the identified at least one of the plurality of devices; and
 determining the identified one of the plurality of devices as a data obtain target from which the shared data is to be obtained based on a participation order of the event, in a case where one of the plurality of devices has already obtained the shared data and is not transmitting the shared data, the participation order of the event being an order in which the plurality of devices are participating in the event.

7. A data process apparatus for sharing shared data among a plurality of devices participating in an event via a network, the data process apparatus comprising:
 a processor, in communication with a memory, configured to execute the steps of
  retrieving a first information indicating one or more of the plurality of devices that has completed transmission of the shared data and a second information indicating one or more of the plurality of devices that is currently transmitting the shared data,
  identifying the earliest participating one of the plurality of devices that is not currently transmitting the shared data based on the first and second information, and
  determining the identified one of the plurality of devices as a data obtain target from which the shared data is to be obtained based on a participation order of the event, in a case where one of the plurality of devices has already obtained the shared data and is not transmitting the shared data, the participation order of the event being an order in which the plurality of devices participate in the event.

* * * * *